United States Patent
Hwang et al.

(10) Patent No.: US 10,383,001 B2
(45) Date of Patent: *Aug. 13, 2019

(54) TRANSMITTING APPARATUS, RECEIVING APPARATUS AND SIGNAL PROCESSING METHOD THEREOF

(71) Applicant: SAMSUNG ELECTRONICS CO., LTD., Suwon-si (KR)

(72) Inventors: Sung-hee Hwang, Suwon-si (KR); Hyun-Koo Yang, Seoul (KR); Sung-oh Hwang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,225

(22) Filed: Feb. 26, 2018

(65) Prior Publication Data

US 2018/0199235 A1   Jul. 12, 2018

Related U.S. Application Data

(63) Continuation of application No. 15/385,016, filed on Dec. 20, 2016, now Pat. No. 9,906,982, which is a (Continued)

(51) Int. Cl.
*H04W 28/06* (2009.01)
*H04L 29/06* (2006.01)
*H04L 27/26* (2006.01)

(52) U.S. Cl.
CPC .......... *H04W 28/065* (2013.01); *H04L 69/22* (2013.01); *H04W 28/06* (2013.01); *H04L 27/2601* (2013.01)

(58) Field of Classification Search
CPC .... H04W 28/065; H04W 28/06; H04L 69/22; H04L 27/2601
See application file for complete search history.

(56) References Cited

U.S. PATENT DOCUMENTS 9,167,281 B2   10/2015   Petrov et al.
9,553,957 B2*  1/2017   Hwang ................. H04W 28/06
(Continued)

FOREIGN PATENT DOCUMENTS

CN   101933325 A   12/2010
CN   102301705 A   12/2011
(Continued)

OTHER PUBLICATIONS

"Digital Video Broadcasting (DVB); Next Generation broadcasting system to Handheld, physical layer specification (DVB-NGH)," Nov. 2012, ETSI.

(Continued)

*Primary Examiner* — Jae Y Lee
(74) *Attorney, Agent, or Firm* — Sughrue Mion, PLLC

(57) ABSTRACT

A method for generating a packet of transmitting apparatus is provided. The method includes: setting a value of a Deleted Null Packet (DNP) counter to zero; increasing the value for each deleted null packet preceding a non-null transport stream (TS) packet; and generating a packet comprising a header and a payload, wherein the header includes a DNP field, the payload includes the non-null TS packet, and the value of the DNP counter is used to set the DNP field.

3 Claims, 35 Drawing Sheets

Related U.S. Application Data continuation of application No. 14/337,435, filed on Jul. 22, 2014, now Pat. No. 9,553,957.

(60) Provisional application No. 61/873,470, filed on Sep. 4, 2013, provisional application No. 61/861,016, filed on Aug. 1, 2013, provisional application No. 61/856,909, filed on Jul. 22, 2013.

(56) References Cited

U.S. PATENT DOCUMENTS

| | | | |
|---|---|---|---|
| 9,854,279 B2 | 12/2017 | Petrov et al. | |
| 9,906,982 B2 * | 2/2018 | Hwang | H04W 28/06 |
| 2006/0274737 A1 | 12/2006 | Liu et al. | |
| 2011/0013718 A1 | 1/2011 | Ko et al. | |
| 2012/0042092 A1 | 2/2012 | Hong et al. | |
| 2012/0170596 A1 | 7/2012 | Hwang et al. | |
| 2012/0307842 A1 | 12/2012 | Petrov et al. | |
| 2012/0314762 A1 | 12/2012 | Herrmann et al. | |
| 2014/0003540 A1 | 1/2014 | Okada et al. | |
| 2015/0237175 A1 | 8/2015 | Michael | |
| 2016/0037192 A1 | 2/2016 | Petrov et al. | |

FOREIGN PATENT DOCUMENTS

| | | | | |
|---|---|---|---|---|
| CN | 102497346 A | | 6/2012 | |
| CN | 102860023 A | | 1/2013 | |
| EP | 2 362 654 A1 | | 8/2011 | |
| EP | 2 424 239 A2 | | 2/2012 | |
| EP | 2424239 | * | 2/2012 | H04N 7/173 |
| EP | 2725787 A2 | | 4/2014 | |
| WO | 2010/087546 A1 | | 8/2010 | |
| WO | 2012/177062 A2 | | 12/2012 | |

OTHER PUBLICATIONS

Communication dated Jan. 30, 2017 issued by the European Patent Office in counterpart European Patent Application No. 14828802.0.

Search Report dated Nov. 13, 2014, issued by the International Searching Authority in counterpart International Application No. PCT/KR2014/006646.

Written Opinion dated Nov. 13, 2014, issued by the International Searching Authority in counterpart International Application No. PCT/KR2014/006646.

Communication dated Feb. 13, 2018, from the State Intellectual Property Office of People's Republic of China in counterpart Application No. 201480041602.X.

Communication dated Nov. 2, 2018, issued by the State Intellectual Property Office of P.R. China in counterpart Chinese Application No. 201480041602.X.

Communication dated Jan. 31, 2019, from the State Intellectual Property Office of People's Republic of China in counterpart Application No. 201480041602.X.

* cited by examiner

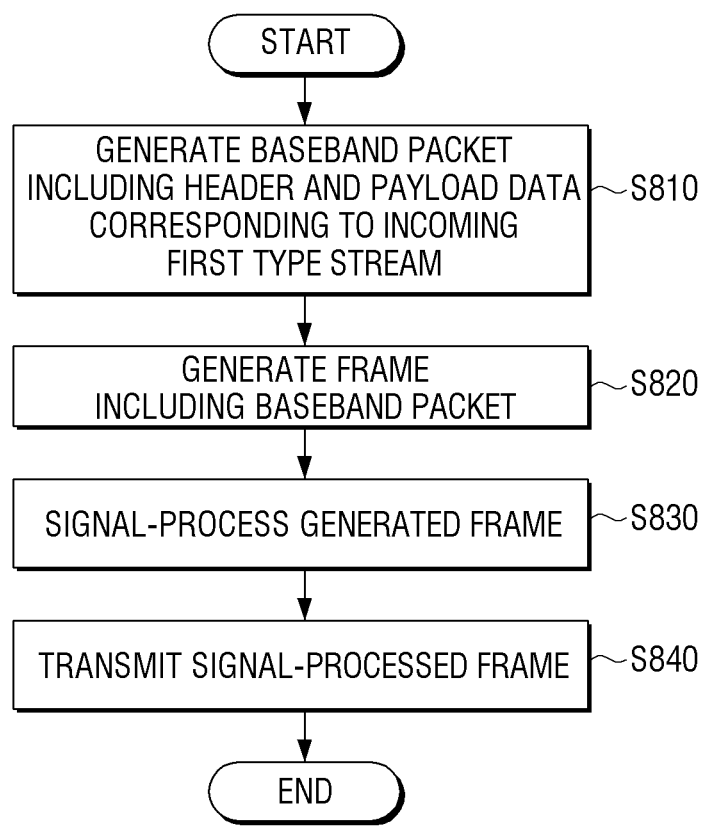

TRANSMITTING APPARATUS, RECEIVING APPARATUS AND SIGNAL PROCESSING METHOD THEREOF

CROSS-REFERENCE TO THE RELATED APPLICATIONS

This is a continuation of U.S. application Ser. No. 15/385,016 filed Dec. 20, 2016, which is a continuation of U.S. application Ser. No. 14/337,435 filed Jul. 22, 2014, which claims priority from Korean Patent Application No. 10-2014-0054762, filed on May 8, 2014 in the Korean Intellectual Property Office, and U.S. Provisional Application Nos. 61/861,016, 61/873,470, and 61/856,909, filed Aug. 1, 2013, Sep. 4, 2013 and Jul. 22, 2013, respectively, the disclosures of which are incorporated herein by reference in their entirety.

BACKGROUND

1. Field

Apparatuses and methods consistent with exemplary embodiments of the inventive concept relate to a transmitting apparatus, a receiving apparatus, and a signal processing method thereof, and more specifically, to a transmitting apparatus configured to map and transmit data with one or more signal processing paths, the receiving apparatus, and the signal processing method thereof.

2. Description of the Related Art

In the information society of the 21st century, broadcasting communication services embrace the emergence of digitization, multichannel distribution, wideband establishment, and high-quality production. Specifically, as the distribution and use of high-quality digital television (TV), portable medial player (PMP), and mobile devices explode, digital broadcasting services meet increasing demands for supporting various receiving methods.

To meet such demands, standardization groups designate various standards, and provide various services to meet user needs. Thus, a method is necessary, which can provide better services with more enhanced performances.

SUMMARY

One or more exemplary embodiments of the present inventive concept may overcome the above disadvantages and other disadvantages not described above. However, the present inventive concept is not required to overcome the disadvantages described above, and exemplary embodiments of the present inventive concept may not overcome any of the problems described above.

One or more exemplary embodiments are provided considering the current situation in which standardization groups designate various standards and provide various services to meet user needs.

According to an aspect of an exemplary embodiment, there is provided a transmitting apparatus which may include: a baseband packet generator configured to generate a baseband packet including a header and payload data corresponding to an input stream; a frame generator configured to generate a frame including the baseband packet; a signal processor configured to process the generated frame; and a transmitter configured to transmit the processed frame, wherein the header includes information about whether a number of null packets deleted when generating the baseband packet is more than a predetermined number, information about a number of packets within the baseband packet, and information about a number of the deleted null packets.

The input stream may be a transport stream.

Further, the header may include information about an input stream clock reference (ISCR) related with the baseband packet.

Further, the header may include a base header and an option header. The base header may include the information about whether the number of null packets deleted when generating the baseband packet is more than the predetermined number, the information about the number of the packets within the baseband packet, and the information about the number of null packets less than the predetermined number, and the option header may include the ISCR information and information about a number of null packets exceeding the predetermined number when the number of the deleted null packets is more than the predetermined number.

Further, the base header may include one (1) byte field, and the one (1) byte field may include a one (1) bit field indicating whether the number of null packets deleted when generating the baseband packet is more than the predetermined number, a four (4) bit field indicating the number of the packets, and a three (3) bit field indicating information about the number of null packets less than the predetermined number.

Further, the option header may include a 24 bit field indicating the ISCR information and an eight (8) bit field indicating information about the number of null packets exceeding the predetermined number when the number of the deleted null packets is more than the predetermined number.

Further, the frame including the baseband packet may be a baseband frame, and the signal processor may generate a transmitting frame by processing the baseband frame and mapping the input stream with one or more signal processing paths.

According to an aspect of another exemplary embodiment, there is provided a receiving apparatus configured to receive data from a transmitting apparatus which maps the data included in an input stream with one or more signal processing paths and transmits the same. This receiving apparatus may include: a receiver configured to receive a frame comprising the data; and a signal processor configured to extract header information from a baseband packet included in the frame and process payload data included in the baseband packet based on the header information, wherein the header information comprises information about whether a number of null packets deleted when generating the baseband packet is more than a predetermined number, a number of the packets within the baseband packet, and a number of the deleted null packets.

The input stream may be a transport stream.

Further, the header information may include the ISCR information.

Further, the header may include a base header and an option header. The base header may include the information about whether the number of null packets deleted when generating the baseband packet is more than the predetermined number, the information about the number of the packets within the baseband packet, and the information about the number of null packets less than the predetermined number, and the option header may include the ISCR information and information about a number of null packets exceeding the predetermined number when the number of the deleted null packets is more than the predetermined number.

Further, a signal processing method of a transmitting apparatus may include: generating a baseband packet comprising a header and payload data corresponding to an input stream; generating a frame comprising the baseband packet; processing the generated frame; and transmitting the processed frame, wherein the header comprises information about whether a number of null packets deleted when generating the baseband packet is more than a predetermined number, information about a number of packets within the baseband packet, and information about a number of the deleted null packets.

The input stream may be a transport stream.

Further, the header may include the ISCR information.

Further, the header may include a base header and an option header. The base header may include the information about whether the number of null packets deleted when generating the baseband packet is more than the predetermined number, the information about the number of the packets within the baseband packet, and the information about the number of null packets less than the predetermined number, and the option header may include the ISCR information and information about a number of null packets exceeding the predetermined number when the number of the deleted null packets is more than the predetermined number.

Further, the base header may include one (1) byte field, and the one (1) byte field may include a one (1) bit field indicating whether the number of null packets deleted when generating the baseband packet is more than the predetermined number, a four (4) bit field indicating the number of the packets, and a three (3) bit field indicating information about the number of null packets less than the predetermined number.

Further, the option header may include a 24 bit field indicating the ISCR information and an eight (8) bit field indicating information about the number of null packets exceeding the predetermined number when the number of the deleted null packets is more than the predetermined number.

Further, the frame including the baseband packet may be a baseband frame, and the signal processor may generate a transmitting frame by processing the baseband frame and mapping the input stream with one or more signal processing paths.

According to an aspect of another exemplary embodiment, there is provided a signal processing method of a receiving apparatus to receive data from a transmitting apparatus which maps the data included in an input stream with one or more signal processing paths and transmits the same. This method may include: receiving a frame including the data; and extracting header information from a baseband packet included in the frame and process payload data included in the baseband packet based on the header information, wherein the header information includes information about whether a number of null packets deleted when generating the baseband packet is more than a predetermined number, a number of the packets within the baseband packet, and a number of the deleted null packets.

The input stream may be a transport stream.

Further, the header may include the ISCR information.

Further, the header may include a base header and an option header. The base header may include the information about whether the number of null packets deleted when generating the baseband packet is more than the predetermined number, the information about the number of the packets within the baseband packet, and the information about the number of null packets less than the predetermined number, and the option header may include the ISCR information and information about a number of null packets exceeding the predetermined number when the number of the deleted null packets is more than the predetermined number.

According to the above various exemplary embodiments, a data processing efficiency can be enhanced because an input stream may be efficiently mapped with a physical layer.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 12 is a flowchart provided to explain in detail a signal processing method of a transmitting apparatus according to an exemplary embodiment;

DETAILED DESCRIPTION OF THE EXEMPLARY EMBODIMENTS

Figure 1:
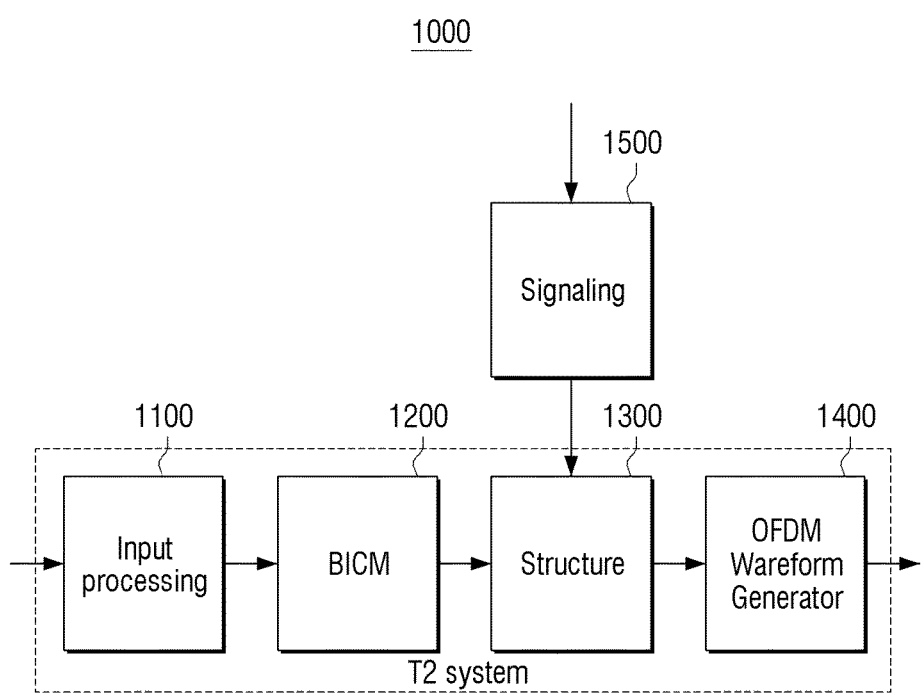
FIG. 1 is a block diagram of a transmitting system according to an exemplary embodiment.

Certain exemplary embodiments of the inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the invention with unnecessary detail.

FIG. 1 is a block diagram of a transmission system according to an exemplary embodiment.

Referring to FIG. 1, the transmission system 1000 may include an input processing block 1100, a Bit Interleaved Coding and Modulation (BICM) block 1200, a structure block 1300 and an OFDM waveform generator block 1400.

The input processing block 1100 generates a BBFRAME (baseband frame) from an input stream of data to be served. The input stream may be a transport stream (TS), an Internet protocol (IP), e.g., IPv4, IPv6, stream, an MPEG media transport) (MMT) stream, a generic stream (GS), or a generic stream encapsulation (GSE) stream.

The BICM block 1200 determines a forward error correction (FEC) coding rate and a constellation order according to area through which data to be served are transmitted, e.g., (fixed PHY frame or mobile PHY frame), and performs encoding and time interleaving. Meanwhile, signaling information about data to be served may be encoded through a separately provided BICM encoder (not illustrated) or encoded by the BICM encoder 1200.

The structure block 1300 generates a transmission frame by combining the time-interleaved data with signaling information.

The orthogonal frequency-division multiplexing (OFDM) waveform generator block 1400 generates OFDM signals on a time domain corresponding to the generated transmission frame, modulates the generated OFDM signals into radio frequency (RF) signals, and transmits the RF signals to a receiver.

The signaling information combined with data in the structure block 1300 may include information about an input type of the input stream which is input to the input processing block 1100 and other various pieces of information, according to an exemplary embodiment. Various exemplary embodiments will be explained in detail below by referring to drawings.

Figure 2:
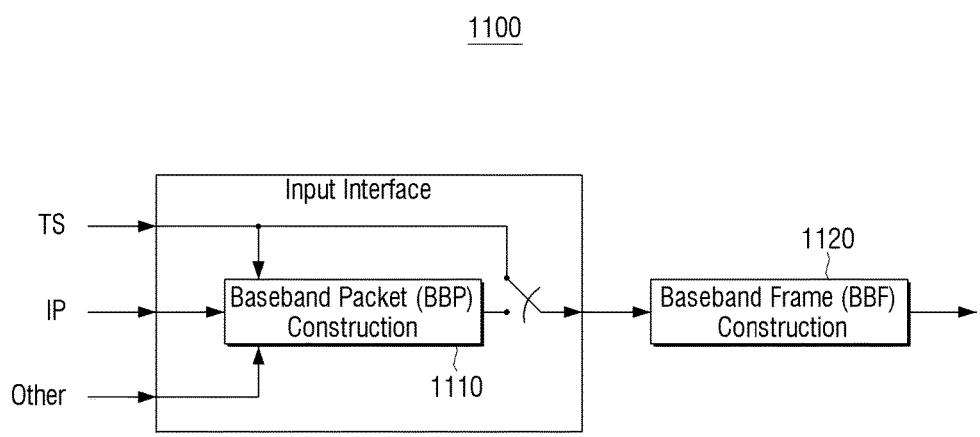
FIG. 2 illustrates an example of input processing block illustrated in FIG. 1, according to an exemplary embodiment.

FIG. 2 illustrates an exemplary embodiment of the input processing block 1100 illustrated in FIG. 1.

Referring to FIG. 2, the input processing block 1100 includes a baseband packet (BBP) construction block 1100 and a baseband frame construction block 1200. The baseband packet construction block 1100 generates a baseband packet from the input stream such as an IP stream. At this process, a TS stream may not be converted to a baseband packet format, and thus, a TS packet constituting a TS stream may correspond to a baseband packet. The baseband frame construction block 1120 generates a baseband frame from the input baseband packets.

FIGS. 3A to 3D are provided to explain a structure of a transmission frame according to exemplary embodiments.

Figure 3A:
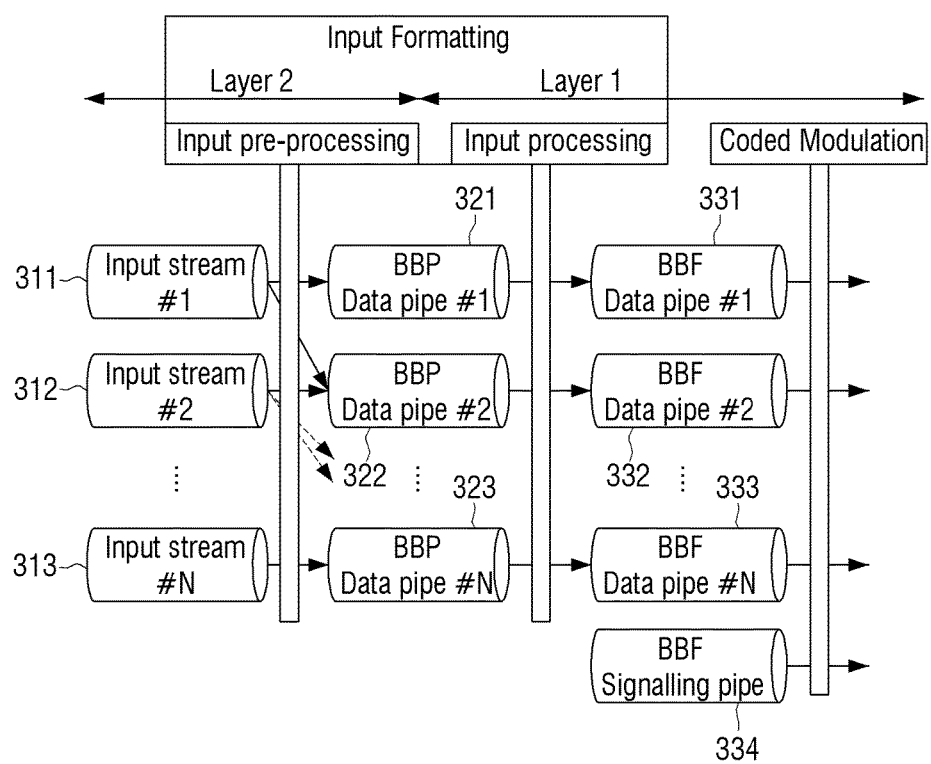
FIGS. 3A to 3D are provided to explain a unit constitution of a transmitting frame according to an exemplary embodiment.

Referring to FIG. 3A, input processing to process the input stream to be a baseband frame may operate at a data pipe level.

FIG. 3A illustrates a process wherein the input stream is processed to be a baseband frame. A plurality of input streams 311 to 313 are processed to be data pipes 321 to 323 of a plurality of baseband packets through input pre-processing, and the data pipes 321 to 323 of the plurality of baseband packets are encapsulated to be data pipes 331 to 333 of a plurality of baseband frames through input processing (See FIG. 1, the input processing block 1100), and scheduled to be transmission frames.

Figure 3B:
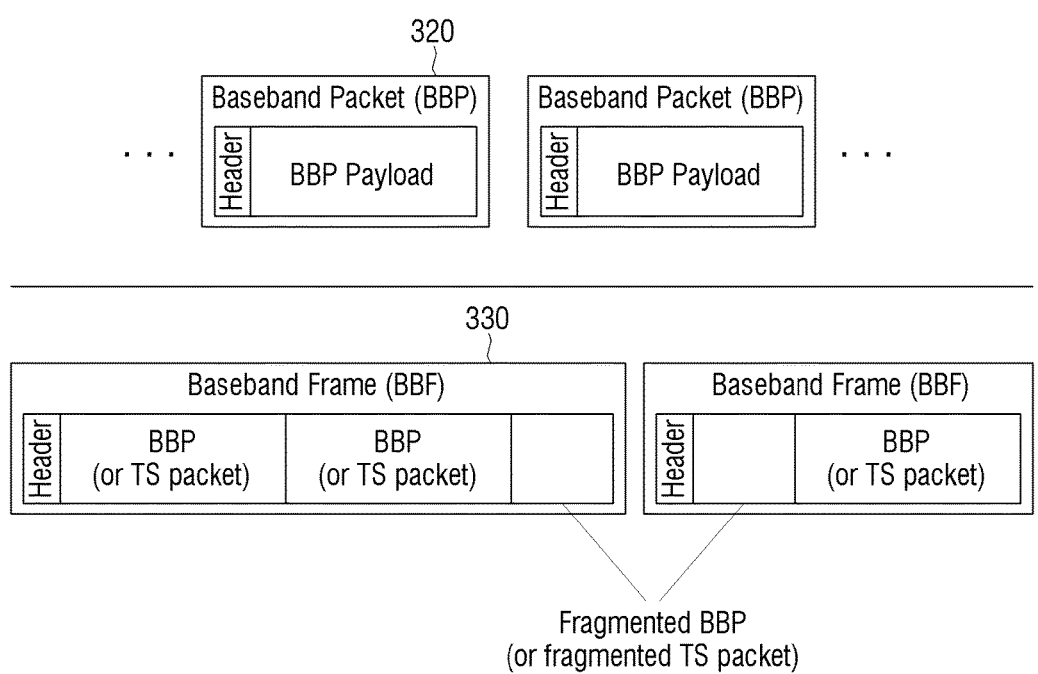

FIG. 3B is a view provided to explain relations between a baseband packet 320 and a baseband frame 330. A payload of the baseband packet 320 is a packet constituting a TS stream and/or another type of stream. Further, the baseband frame 330 may include a plurality of baseband packets or a part of the plurality of baseband packets which may include a fragmented baseband packet.

Figure 3C:
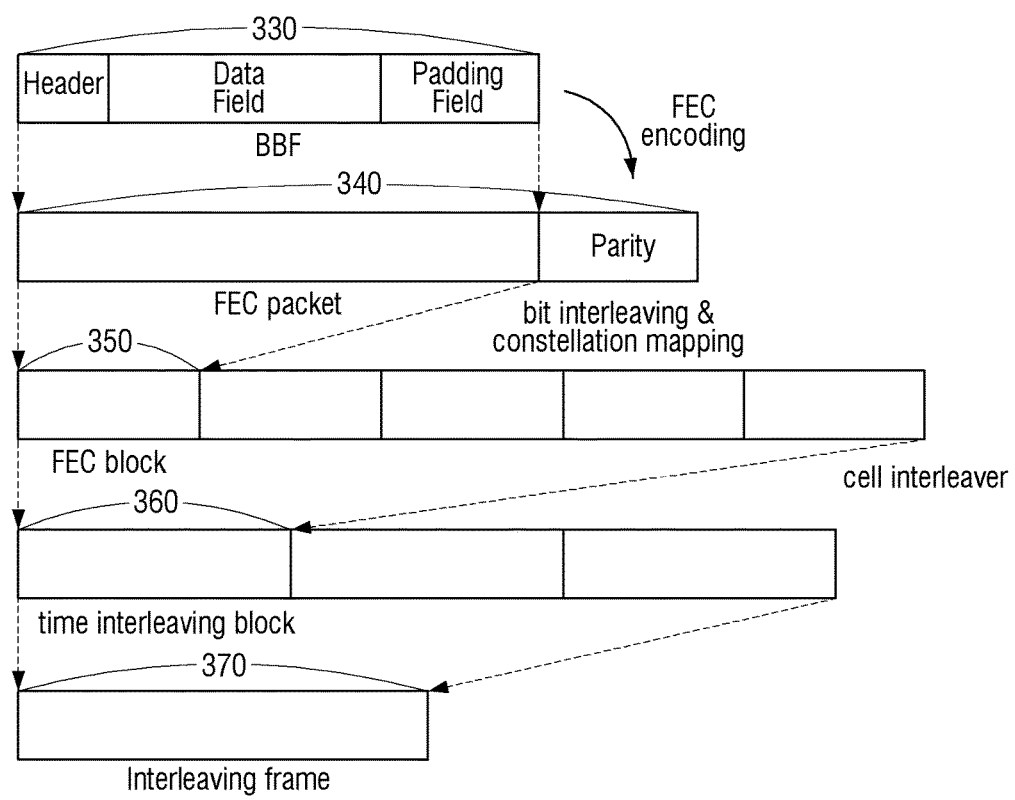

FIG. 3C is a view provided to explain a local frame constitution regarding each physical layer pipe (PLP). The PLP in the present embodiment may correspond to a PLP defined in the Second Generation Digital Terrestrial Television Broadcasting System (DVB-T2) standard.

Referring to FIG. 3C, the baseband frame 330 includes a header, a data field and a padding field.

The baseband frame 330 is processed to be a baseband frame FEC packet 340 by adding parities through an FEC encoding process.

The baseband frame FEC packet 340 is processed to be an FEC block 350 through a bit-interleaving and constellation mapping process, a plurality of FEC blocks are processed to be time-interleaving blocks 360 through a cell-interleaving process, and a plurality of time-interleaving blocks constitute an interleaving frame 370.

Figure 3D:
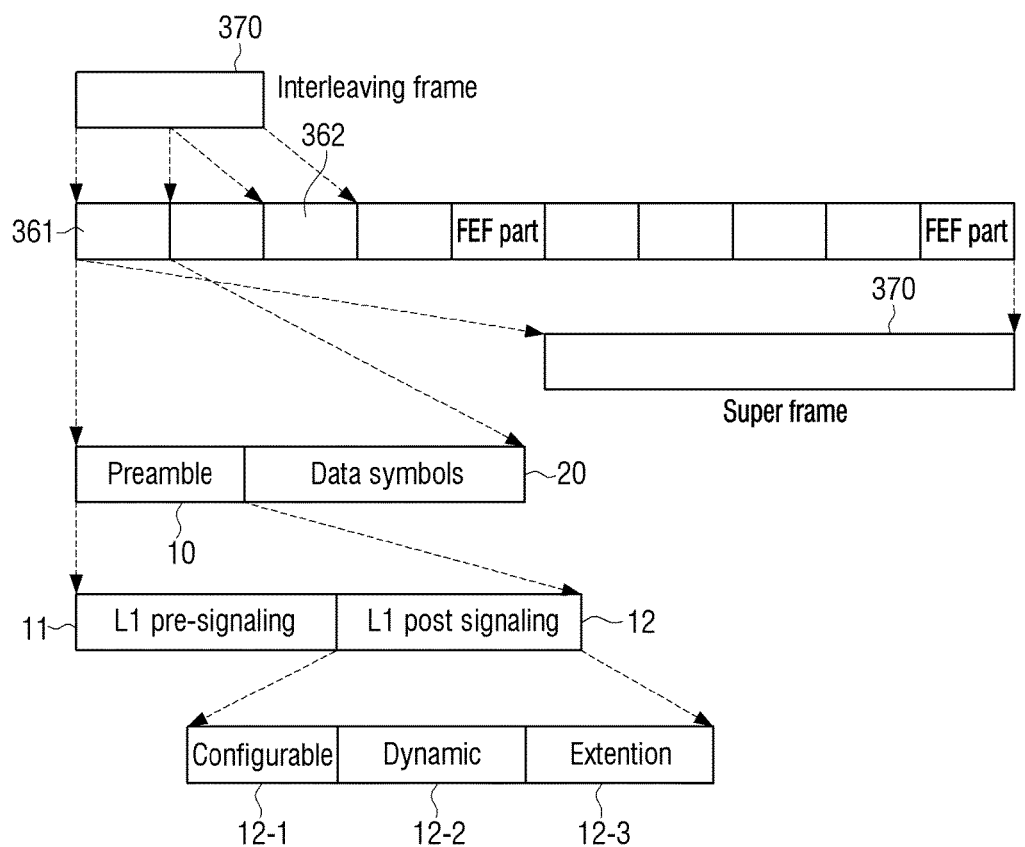

FIG. 3D is a view provided to explain constitution of an interleaving frame.

Referring to FIG. 3D, the interleaving frame 370 may be transmitted through different transmission frames 361, 362, and a plurality of transmission frames and at least one future extension frame (FEF) part may constitute one super frame 370.

Meanwhile, one transmission frame 361 may be constituted with a preamble symbol 10 and a data symbol 20 which transmits data.

The preamble symbol 10 includes an L1 pre-signaling area 11 and an L1 post-signaling area 12. The L1 pre-signaling area 11 may provide basic transmission parameters including parameters requested for receiving and decoding L1 post-signaling, and have a fixed length.

The L1 post-signaling area 12 includes a configurable field 12-1 and a dynamic field 12-2.

The configurable field 12-1 includes information that may differ by super frame unit, and the dynamic field 12-2 includes information that may differ by transmission frame unit. Relations with a super frame and a transmission frame will be explained below in detail.

Further, the L1 post-signaling area 12 may selectively include an extension field 12-3. Further, although not illustrated in FIG. 3D, the L1 post-signaling area 12 may further include a cyclic redundancy check (CRC) field and an L1 padding field.

Figure 4:
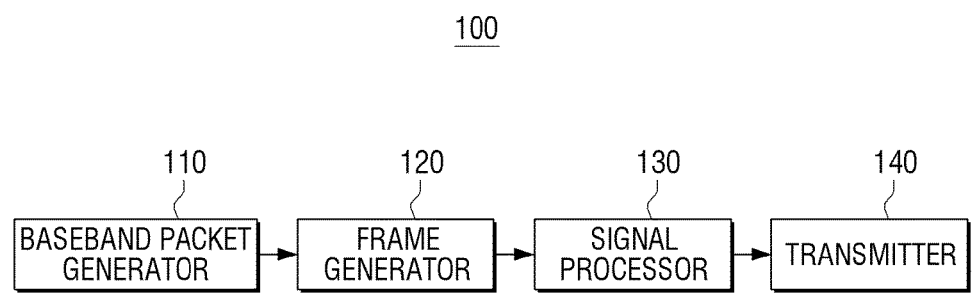
FIG. 4 is a block diagram of a transmitting apparatus according to an exemplary embodiment.

FIG. 4 is a block diagram of a transmitting apparatus 100 according to an exemplary embodiment.

Referring to FIG. 4, the transmitting apparatus 100 includes a baseband packet generator 110, a frame generator 120, a signal processor 130 and a transmitter 140.

The baseband packet generator 110 may generate a baseband packet (or L2 packet) which includes a header and payload data based on an incoming stream. The header may include information about the payload data included in the baseband packet and information about a packet included in the baseband packet. More descriptions about the baseband packet will be provided in a later part of the specification.

The payload data included in the baseband packet may include any one of an IP packet, a TS packet and a signaling packet, or a combination of two or more of the foregoing packets. However, data included in the payload data are not limited to the above, and instead, various types of data may be included. The baseband packet may be considered as a unit packet necessary for mapping various types of incoming data with a physical layer. The payload data included in the baseband packet according to an exemplary embodiment may include a TS packet only, which will be explain in detailed in a later part of the specification.

The frame generator 120 may generate a frame including the baseband packet. The generated frame may be a baseband frame (or L1 packet) including the baseband packet.

The frame generator 120 may generate the baseband frame in a size considering a FEC code by arranging a plurality of baseband packets including an IP packet and a header. The baseband packet according to an exemplary embodiment may be a TS packet; however, the same process may be applied to various types of data as well as the TS packet. Processes of generating the baseband packet and the baseband frame will be explain in detailed with FIGS. 5A and 5B.

Figure 5A:
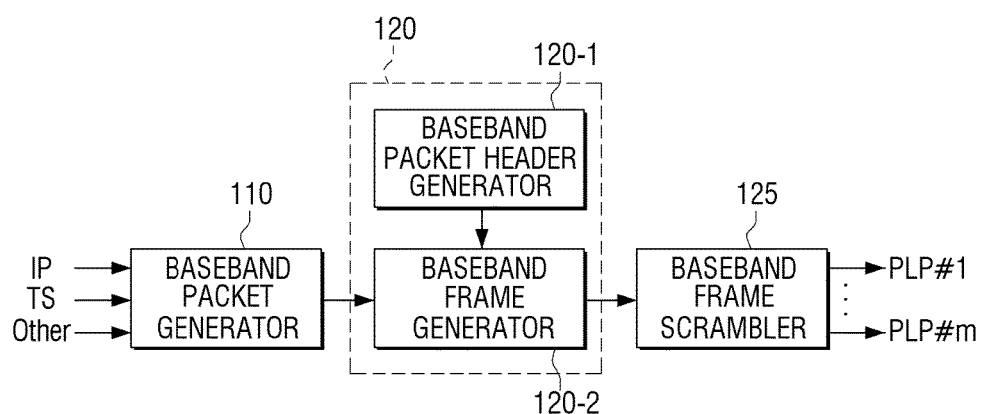
FIG. 5A is a detailed block diagram of a frame generator according to an exemplary embodiment.

FIG. 5A is a detailed block diagram of a frame generator according to an exemplary embodiment.

Referring to FIG. 5A, the frame generator 120 may include a baseband header generator 120-1 and a baseband frame generator 120-2. Further, the baseband frame generator 120 may generated and transmit the baseband frame to a baseband frame scrambler 125.

The baseband packet generator 110 may generate the baseband packet in order to transmit an incoming IP packet, TS packet and other various types of data toward respective PLPs with regard to input modes. The baseband packet corresponds to an L2 packet of the ISO 7 layer model. Thus, the baseband packet generator 110 may generate the baseband packet by encapsulating incoming packets (IP packet, TS packet) from upper layers than the Layer 2.

The baseband header generator 120-1 may generate a header inserted into the baseband frame. The header inserted into the baseband frame is called as a baseband header, and the baseband header includes information about the baseband frame.

When an incoming stream is a TS, the baseband header generator 120-1 may generate the baseband header including information about a number of TS packets within a baseband packet and a number of removed null packets. In addition, the baseband header generated by the baseband header generator 120-1 may include various pieces of information, which will be described below.

Further, the baseband frame generator 120-2 may generate the baseband frame by encapsulating the baseband header generated from the baseband header generator 120-1 with at least one baseband packet outputted from the baseband packet generator 110.

Further, the baseband frame scrambler 125 may randomly scramble data stored in the baseband frame before FEC codes are added to each of the baseband frame, and generate a scramble baseband frame. The scrambled baseband frame is transmitted through a PLP. One PLP may be constituted with baseband frames each having a fixed size. Thus, an incoming stream may be encapsulated into a baseband frame for one PLP.

The PLP indicates a signal path which is independently processed. Thus, each service (e.g., video, extended video, audio and data) may be transmitted and received through a plurality of RF channels. The PLP is a signal path where these services are transmitted or a stream transmitted through this signal path. Further, the PLP may be positioned on slots which are distributed with a time interval on a plurality of RF channels, or may be distributed with a time interval on one RF channel. Thus, one PLP may be distributed and transmitted with a time interval on one RF channel or on a plurality of RF channels.

The PLP structure is configured of an input mode A for providing one PLP and an input mode B for providing a plurality of PLPs. When the input mode B is supported, a service may be provided more robustly. Further, a length of time-interleaving increases by transmitting one stream in a distributed manner, and thus, the time diversity gain can be obtained. Further, when reception of only a specific stream is required, a receiver may be turned off during the time of receiving streams other than the specific stream. Thus, this PLP structure is proper for providing mobile and moving broadcasting services because a mobile or handheld device may have a low electrical power capacity.

The time diversity is a technology which combines a plurality of receiving signals and obtains a better transmission quality at a receiving end when the same signal is transmitted several times with a certain time interval from a transmitting end in order to reduce deterioration of a transmission quality in a mobile communication channel.

Further, transmission efficiency can increase by including information, that can be commonly transmitted through a plurality of PLPs, in one PLP and transmitting this information through one PLP. A PLP0 performs the above function; this PLP is called a common PLP. PLPs other than the PLP0 may be used for transmitting data; these PLPs are called a data PLP. When the common PLP and the data PLP are used, a standard definition television (SDTV) service and a high definition television (HDTV) service for a same program may be provided to a mobile device and a fixed device, respectively. Further, various broadcasting services can be provided to users through broadcasting stations and broadcasting contents providers, and further, distinguished broadcasting services can be provided and received at fringe areas where reception of broadcasting services is difficult.

Figure 5B:
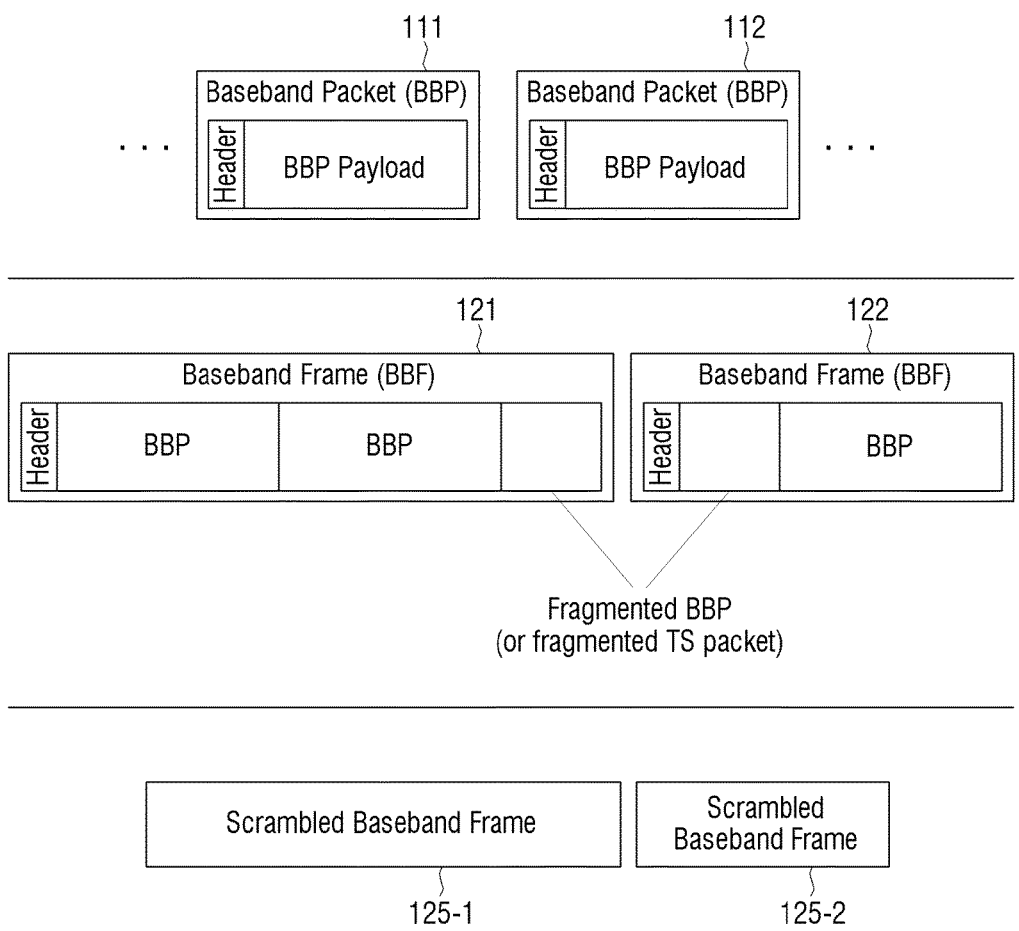
FIG. 5B illustrates a baseband packet, a baseband frame and a scrambled baseband frame according to an exemplary embodiment.

Meanwhile, FIG. 5B illustrates a baseband packet, a baseband frame, and a scramble baseband frame according to an exemplary embodiment.

Referring to FIG. 5B, when the baseband packet generator 110 generates a plurality of baseband packets 111, 112 by storing at least one TS packet in a baseband packet payload and inserting a header, the frame generator 120 may generate a plurality of baseband frames 121, 122 by grouping a plurality of the baseband packets 111, 112 and inserting a baseband header. Each of the baseband frames 121, 122 may include a plurality of baseband packets, and further, a part of the baseband packets which may include a fragmented baseband packet.

The baseband frame scrambler 125 may generate a plurality of scrambled baseband frames 125-1, 125-2 by randomly scrambling the baseband frames 121, 122. Further, the scrambled baseband frames 125-1, 125-2 may be transmitted to at least one PLP as described above, and signal-processing to add FEC codes may be performed.

Referring to FIG. 4 again, the signal processor 130 may signal-process the scrambled baseband frames. According to another exemplary embodiment, the baseband frames generated at the frame generator 120 may not be scrambled before being transmitted to the PLP.

Specifically, the signal processor 130 may signal-process the baseband frame and generate a transmission frame. The transmission frame may indicate the transmission frames 361, 362 illustrated in FIG. 3D.

Further, the signal processor 130 may insert signaling information into a signaling area of the baseband frame. The signaling information may be L1 (Layer 1) signaling signals transmitting L1 signals for frame synchronization. The preamble 10 in which L1 signaling information is inserted may include the L1 pre-signaling area 11 and the L1 post-signaling area 12, as illustrated in FIG. 3D. Further, the L1 post-signaling area 12 includes the configurable field 12-1 and the dynamic field 12-2.

Meanwhile, the L1 pre-signaling area 11 may include information for analyzing the L1 post-signaling and information about a whole system. The L1 pre-signaling area may be configured to have a same length. Further, the L1 post-signaling area 12 may include information about each PLP and information about the system. Although the L1 signaling area included in each frame, i.e., a baseband frame, within one super frame 370 (see FIG. 3D) has a same length, information included therein may be different from one another.

The signaling information may include information about an input type of an incoming stream and information about a type of data mapped with one or more signal processing paths.

The information about an input type may indicate whether every signal processing path within a frame is a same input type or not.

The information about an input type may include information about at least one of a first input type in which every signal processing path transmits only a first type stream on a single mode, a second input type in which every signal processing path transmits the first type stream and a second type stream in a combination mode, a third input type in which every signal processing path transmits a third type stream different from the first type stream in the combination mode, and a fourth input type in which at least two signal processing paths transmit different types of stream.

The first type stream may be a TS stream, the second type stream may be IP stream, and the third type stream may be a stream different from the TS stream and the IP stream.

The signaling information may further include at least one of information about whether to use mode adaptation and information about an Input Stream Synchronizer (ISSY) mode, when one or more signal processing paths includes a TS stream.

The information about an input type of an incoming stream may be included in the L1 pre-signaling area 11 and the information about a type of data may be included in the L1 post-signaling area 12. The information about a type of data may be included in the configurable field 12-1.

The signal processor 130 may perform functions corresponding to those of the BICM block 1200 and the structure block 1300 illustrated in FIG. 1.

The transmitter 140 may transmit the signal-processed frame to a transmitting apparatus (not illustrated). Here, the signal-processed frame may indicate the transmission frames 361, 362 illustrated in FIG. 3D.

The transmitter 140 may perform function corresponding to those of the OFDM waveform generator block 1400 illustrated in FIG. 1. Thus, the transmitter 140 performs modulation to modulate a frame generated at the frame generator 120 and processed at the signal processor 130 into RF signals, and transmit the RF signals to a receiving apparatus (not illustrated).

A method for deleting a null packet according to an exemplary embodiment and a baseband packet format or configuration will be explained below in detail.

Figure 6A:
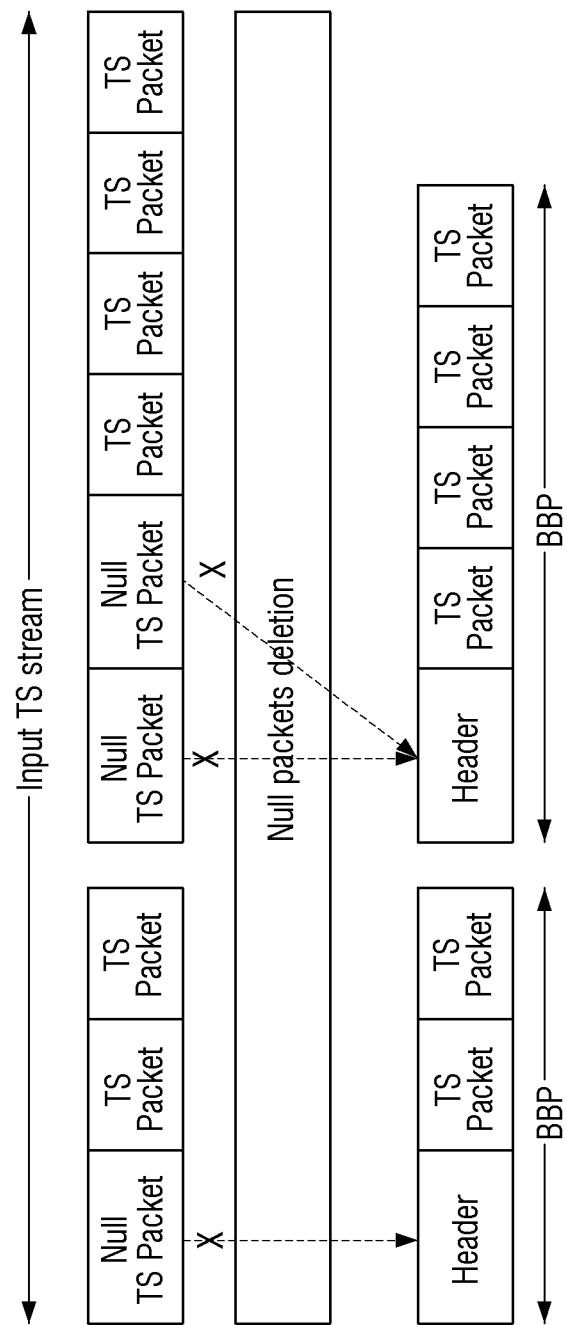
FIG. 6A is a view provided to explain a method for deleting a null packet according to an exemplary embodiment.

FIG. 6A illustrates a method for deleting a null packet according to an exemplary embodiment.

A TS rule requests that a bit rate should be maintained regardless of time change when outputting in a multiplexer of a transmitting apparatus and a demultiplexer of a receiving apparatus, and an end-to-end delay should also be maintained. Regarding some incoming TS signals, a certain amount of null packets may be generated in order to accommodate a variable bit rate service in a certain bit rate streams. In this case, TS null packets may be distinguished (PID=8191) and deleted in order to avoid an unnecessary transmission overhead. The above deleting may be performed by a method in which the deleted null packets can be inserted again on the positions where they are placed at a receiving apparatus. Thus, a certain amount of bit rates can be secured and necessity of updating a Program Clock Reference (PCR) timing stamp can be reduced.

When a null packet is deleted as illustrated in FIG. 6A, a TS packet (i.e., a TS packet of PID≠8191) is transmitted without a null packet (i.e., a TS packet of PID=8191).

A counter called as a Deleted Null Packet (DNP) is first reset before transmitting a baseband packet. At this time, the deleted null packets disposed prior to consecutive valid TS packets in the baseband packet are counted. When the DNP reaches a predetermined maximum value, a null packet disposed prior to the TS packets is considered to be a valid packet and transmitted.

The maximum DNP value may vary according to a format of a baseband packet. For example, if the format is set to transmit a TS stream only through a same PLP, the DNP has a maximum length of 11 bits (see FIG. 6B), and thus, the maximum value becomes 2047.

Figure 6B:
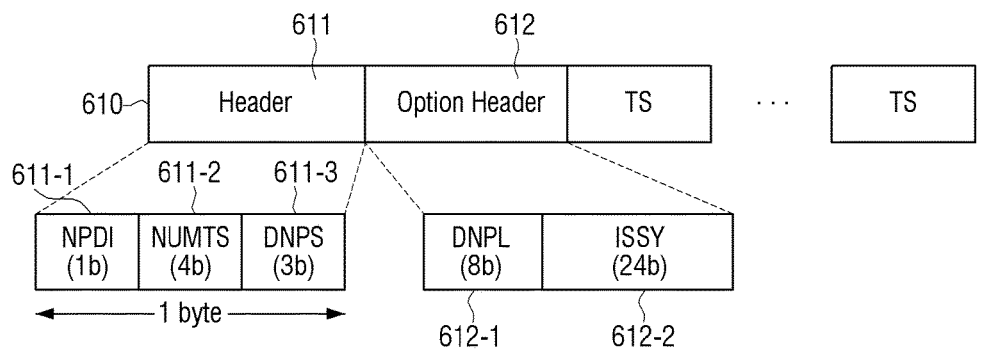
FIG. 6B illustrates a baseband packet format according to an exemplary embodiment.

FIG. 6B illustrates a baseband packet format according to an exemplary embodiment.

FIG. 6B illustrates a baseband packet format when an incoming stream of a PLP is constituted with a TS stream only according to an exemplary embodiment.

Referring to FIG. 6B, when an incoming stream includes a TS stream only, a base header 611 of a baseband packet 610 includes an NPDI field 611-1, an NUMTS field 611-2 and a DNPS field 611-3.

The NPDI field 611-2 indicates a relative length of a DNP counter, and may be implemented by one (1) bit field. If more than eight (8) null packets prior to TS packets are deleted when generating a baseband packet, the NPDI field may be set to "1". In this case, a number of deleted null packets may be provided by combining the DNPS field 611-3 (3 LSB bits) of the base header 611 and a DNPL field 612-1 (8 MSB bits) of an option header 612 which will be described below. If less than eight (8) null packets prior to TS packets are deleted when generating a baseband packet, the NPDI field may be set to "0", and the number of the deleted null packets may be provided in the DNPS field 611-3 (3 LSB bits).

The NUMTS field 611-2 indicates the number of TS packets within a baseband packet, i.e., the number of TS packets in a current group of TS packets, and may be implemented by a four (4) bit field. NUMTS="0" indicates that 16 packets are transmitted within a baseband packet, and the other values may indicate the number of TS packets. For example, NUMTS="1" indicates that one TS packet is transmitted. Therefore, up to 16 TS packets may be transmitted within one baseband packet, i.e., within one packet group. For another example, NUMTS may be expressed by one (1) less than the number of TS packets within a baseband packet.

The DNPS field 611-3 indicates the number of null TS packets deleted prior to a TS packet group if the number of deleted null TS packets is less than eight (8), and may be implemented by a three (3) bit field. If the number of deleted null packets is more than eight (8), the DNPS field 611-3 provides a DNP counter field of three (3) LSB bits, and the DNPL field 612-1 provides a DNP counter field of eight (8) MSB bits in the option header 612.

Meanwhile, the option header 612 of the baseband packet 610 includes the DNPL field 612-1 and an ISSY field 612-2.

As discussed above, the DNPL field 612-1 provides a DNP counter field of eight (8) MSB bits. Three (3) LSB bits are provided from the DNPS field 611-3 of the base header 611. As a result, the DNP counter field may have a length of 11 bits at the maximum, and perform signaling to delete 2,047 null packets at the maximum in a baseband packet. An eight (8) bit field may be provided only if the NPD1 field 611-2 is set to "1", i.e., if more than eight (8) null packets are deleted prior to the baseband packet.

The ISSY field 612-2 indicates an input stream clock reference (ISCR) related to a TS packet group in a baseband packet, and may be implemented by a three (3) byte field. This clock reference may support reproducing a TS stream through correct timing at a receiving apparatus. The ISSY field 612-2 may be included in the option header 612 of a first baseband packet of a baseband frame if an ISSY1 (PLP_ISSY_IND) is set to "1" in L1 signaling regarding a PLP, i.e., when ISSY is activated. In this case, all baseband packets within a baseband frame may be delayed, and thus, a same timing reference is requested for all baseband packets of one same baseband frame.

For example, the ISSY field 612-2 may transmit an ISCR value indicating a counter value at a moment when a first TS packet included in a baseband packet is input to the baseband packet construction block 1110 shown in FIG. 2. Here, the counter is operated at an interval predetermined between a transmitting apparatus and a receiving apparatus.

However, the above-described values of each field, e.g., the number of bits, may be modified so as to be proper for a system operation, according to an exemplary embodiment.

FIGS. 7A to 7D illustrate a baseband packet format according to another exemplary embodiment.

Referring to FIGS. 7A to 7D, an NPD byte indicates the number of deleted null packets, or a quotient calculated from dividing the number of deleted null packets by 16. In this case, the number of deleted null packets (NPDI=10 or 11) may be calculated according to a following mathematical formula.

$$16*(\text{value of NPD byte})+\text{mod}(\text{continuity counter of current TS packet}-\text{continuity counter of previous non-deleted TS packet}-1,16) \quad (1),$$

where mod (x, y) indicates a remainder calculated from dividing x with y.

Figure 7A:
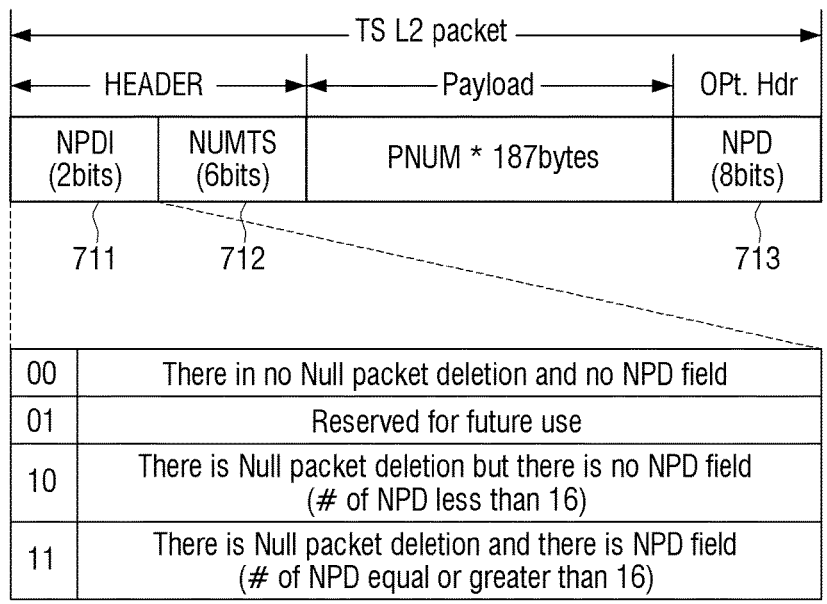
FIGS. 7A to 7D illustrate baseband packet formats according to other exemplary embodiments.

Referring to FIG. 7A, a TS baseband packet may be formatted such that a one (1) byte header, a payload (without a sync byte) and a one (1) byte option header including an NPD field 713 are consecutively arranged. The header may include an NPDI field 711 of two (2) bits and an NUMTS 712 field of six (6) bits.

If the NPDI field 711 is set to a value "11", the NPD field 713 is allocated at an end of the payload, and indicates a quotient calculated from dividing the number of deleted null packets with 16. The number of deleted null packets (NPDI=10 or 11) may be calculated according to the above-mentioned mathematical formula 1.

Further, a length of the payload may be calculated with NUMTS×187 bytes.

Figure 7B:
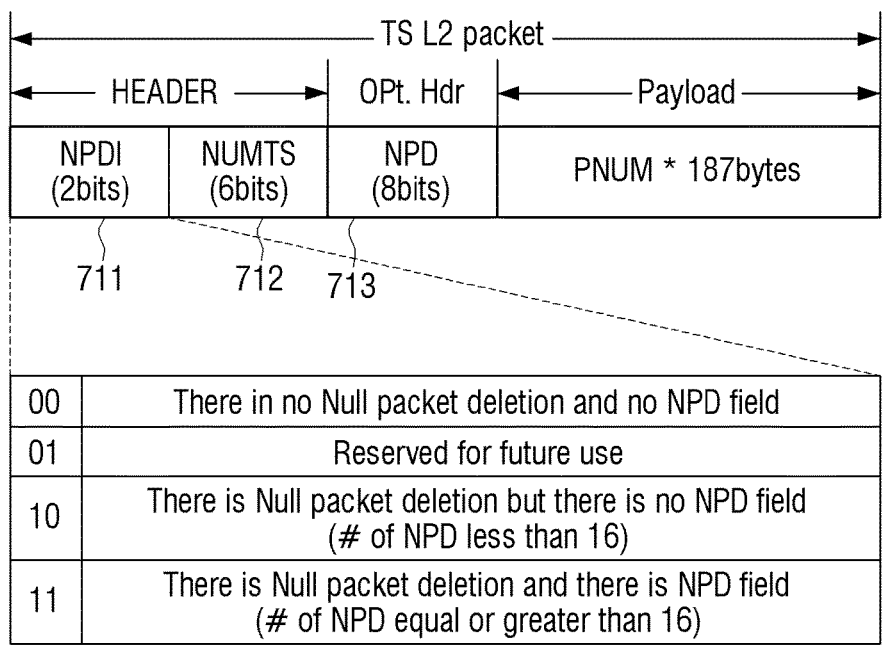

FIG. 7B illustrates a modified exemplary embodiment of FIG. 7A. Referring to FIG. 7B, a TS baseband packet may be formatted such that a one (1) byte header, a one (1) byte option header including an NPD field 713 and a payload (without a sync byte) are consecutively arranged. Here, the one (1) byte NPD field may be arranged at a front of the payload.

Figure 7C:
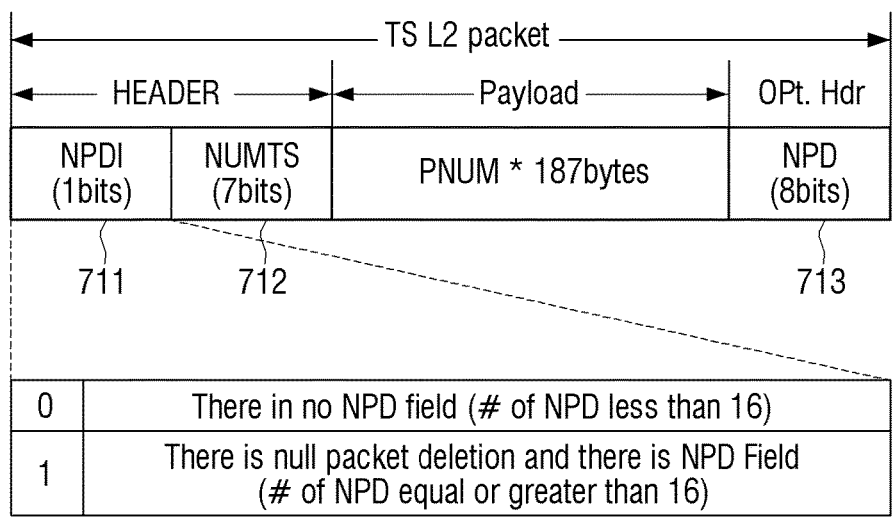

Referring to FIG. 7C, a TS baseband packet may be formatted such that a one (1) byte header, a payload (without a sync byte) and a one (1) byte option header including an NPD field 713 are consecutively arranged. Here, differently from FIG. 7A, an NPDI field 711 may have one (1) bit, and an NUMTS field 712 may have seven (7) bits.

When the NPDI field 711 is set to a value "1", the NPD field 713 is allocated at an end of the payload, and indicates a quotient calculated from dividing the number of deleted null packets with 16. Here, the number of deleted null packets (NPDI=0 or 1) may be calculated according to the above-mentioned mathematical formula 1.

Figure 7D:
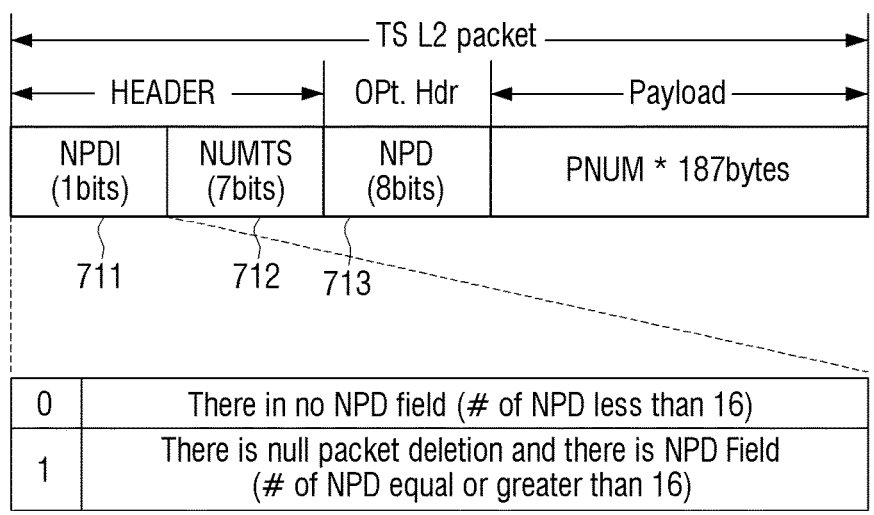

FIG. 7D illustrates a modified exemplary embodiment of FIG. 7C. Referring to FIG. 7D, a one (1) byte option header including an NPD field 713 may be arranged at a front of a payload.

FIGS. 8A to 8F illustrate a baseband packet format according to another exemplary embodiment.

Referring to FIGS. 8A to 8D, an SN byte may be allocated for a TS packet. The SN byte may be allocated at a front of each TS packet in a TS packet stream. Here, the SN byte may have MSB 8 bits regarding a TS sequence number (SN) of the TS packet stream, and a continuity counter (4 bits) in each TS packet may have LSB 4 bits regarding the TS SN. Thus, 12 bits combined with the SN byte and the continuity counter may be generated.

If a TS stream includes a plurality of packet IDs as a range of the continuity counter is determined by a packet ID in a TS packet header, the SN byte becomes a TS SN (8 bits).

The TS SN starts from a predetermined value which increases one by one regarding each TS packet, reaches to a maximum value, and goes back to "0". This indicates that the SN byte increases one by one regarding each of 16 TS packets. When a TS stream includes a plurality of packet IDs as the range of the continuity counter is determined by a packet ID in a TS packet header, the SN byte increases one by one regarding each TS packet.

If deleting a sync byte is activated, the SN byte replaces the sync byte.

When deleting a null packet is activated, null packets and the SN byte are removed to Z−1.

When an NPD is activated, the number of deleted null packets may be calculated by a following mathematical formula 2.

$$\text{Mod}(\text{current TS SN}-\text{previous current TS SN}-1, Z),$$
$$\text{when } Z=2^{\wedge}(\text{size of TS SN (in bits)}) \quad (2),$$

where mod (x, y) indicates a remainder calculated from dividing x with y.

If there are TS packets having error or loss between two TS packets, the number of error or loss TS packets (to Z−1) may be confirmed from two TS SNs of two TS packets, and a decoder of a receiving apparatus may maintain a bit rate by replacing a loss TS packet or an error TS packet with a null packet. Here, the error TS packet indicates a packet in which Transport Error Indicator (TEI) is set to a value "1" in a TS packet header.

Figure 8A:
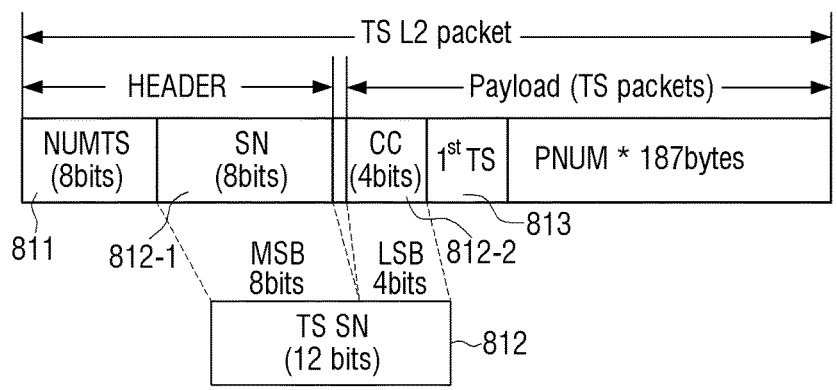
FIGS. 8A to 8D illustrate baseband packet formats according to other exemplary embodiments.

Referring to FIG. 8A, combining the SN field 812-1 of a first TS packet 813 and a continuity counter (CC) field 812-2 in a TS L2 packet constitutes a TS SN 812 regarding a TS packet in a TS packet stream before deleting null packets. Here, the SN field 812-1 may have MSB 8 bits, and the CC field 812-2 may have LSB 4 bits.

The number of deleted null packets between two consecutive TS L2 packets may be calculated according to a following mathematical formula 3.

$$\text{TS SN for first TS packet of current TS L2 packet} - \text{TS SN for first TS packet of previous TS L2 packet} - \text{NUMTS of previous TS L2 packet} \qquad (3)$$

Meanwhile, if a TS L2 packet is lost between two TS L2 packets, the number of lost TS packets (maximum 4,096) may be exactly recognized from a difference between two TS SNs regarding two TS L2 packets. Thus, the decoder may maintain a bit rate by replacing a loss TS packet or an error TS packet with a null packet.

Figure 8B:
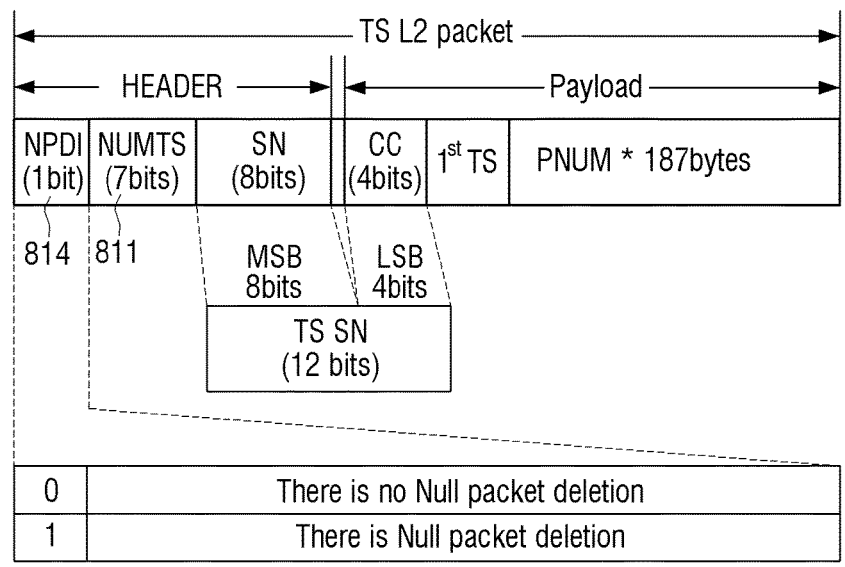

Referring to FIG. 8B, an NPDI field 814 with one (1) bit in the embodiment of FIG. 8A may be added, and a size of an NUMTS field 811 may be reduced to be seven (7) bits.

Figure 8C:
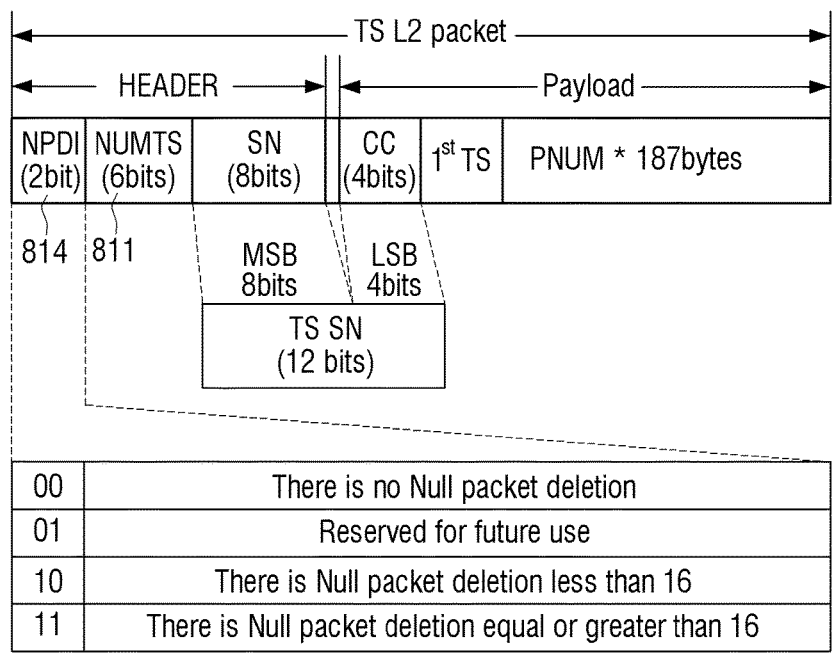

Referring to FIG. 8C, an NPDI field 814 with two (2) bits in the embodiment of FIG. 8A may be added, and a size of an NUMTS field 811 may be reduced to be six (6) bits.

Figure 8D:
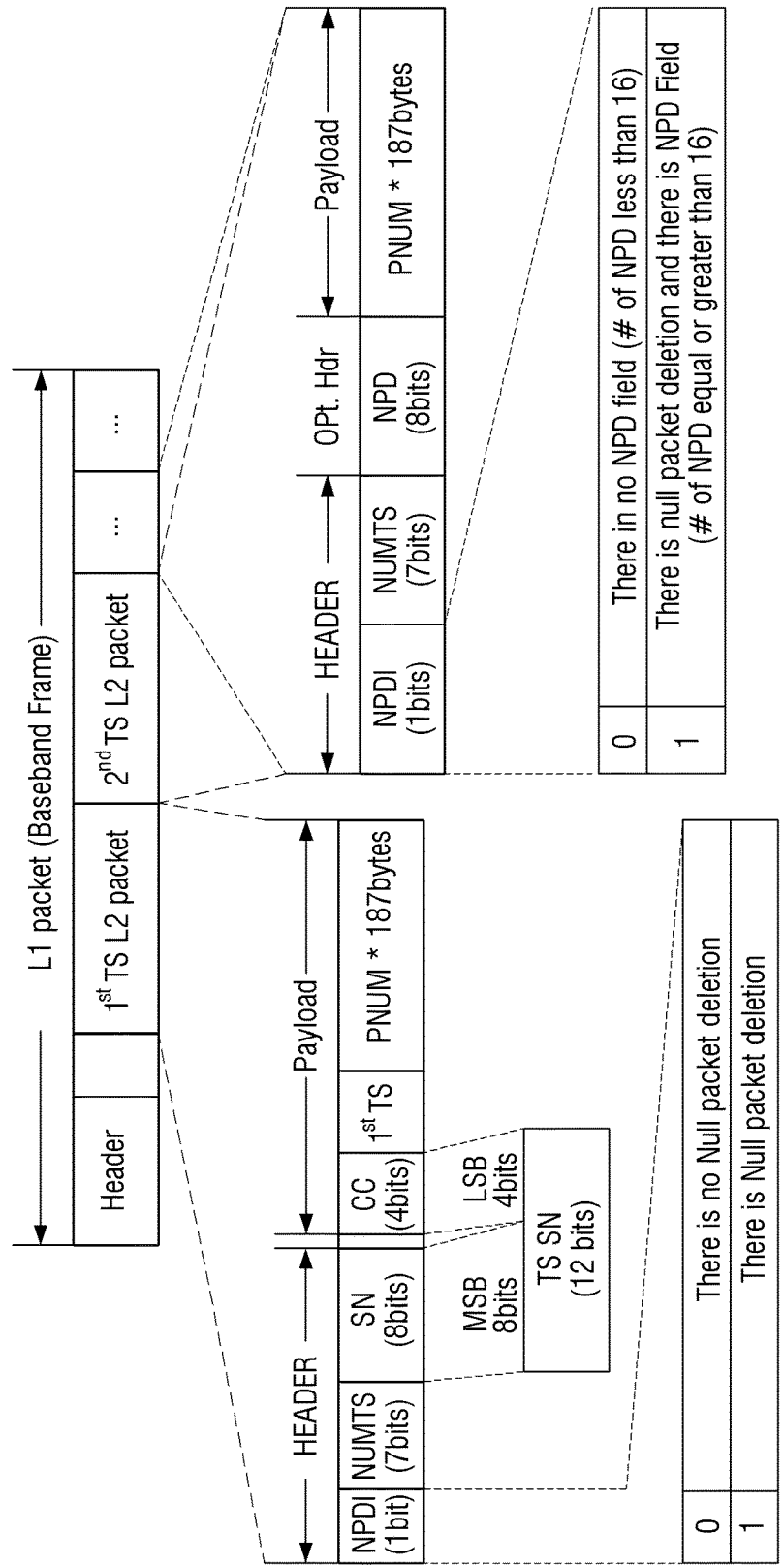

Referring to FIG. 8D, the embodiment of FIG. 8A or FIG. 8B or FIG. 8C may be applied to a first TS L2 packet of an L1 packet. Further, the embodiment of FIG. 7B or FIG. 7D may be applied to another L2 packet (baseband packet) of an L1 packet (baseband frame).

FIGS. 9A to 9H illustrate a baseband packet format according to another exemplary embodiment.

Referring to FIGS. 9A to 9H, an L2 packet header may further include a TYPE field 914 indicating a stream time transmitted through a payload. Here, the TYPE field 914 has two (2) bits. An NPDI field 911, an NUMTS field 912 and an NPD field 913 may have two (2) bits, four (4) bits and eight (8) bits, respectively.

For example, regarding a TS L2 packet, the TYPE field 914 may have a value "00".

Figure 9A:
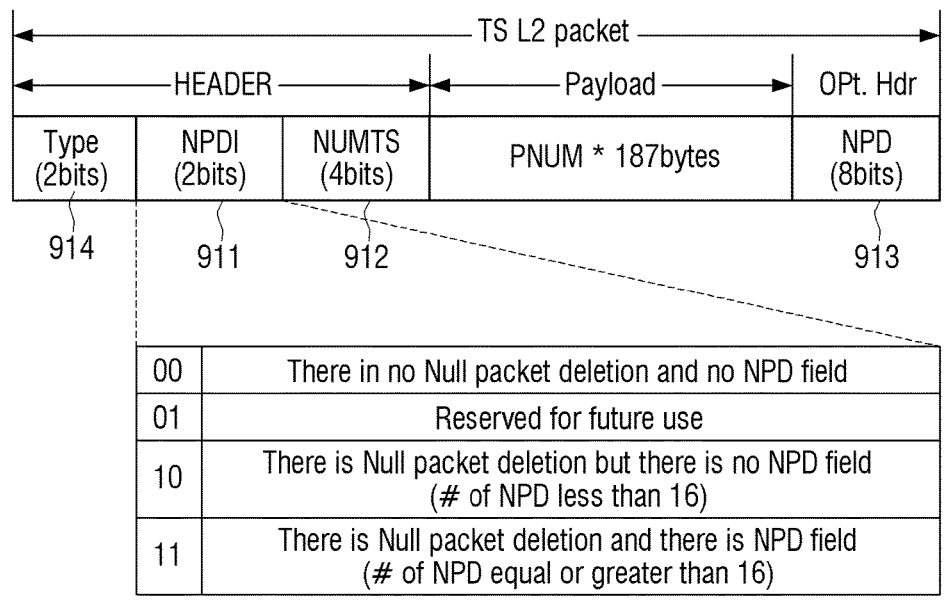
FIGS. 9A to 9H illustrate baseband packet formats according to other exemplary embodiments.
Figure 9B:
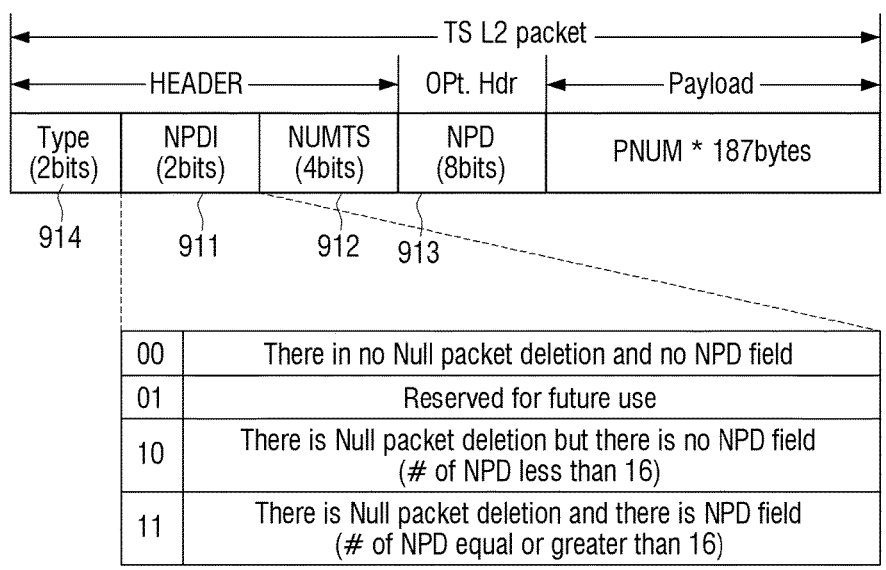

FIG. 9B illustrates a modified embodiment of FIG. 9A. Referring to FIG. 9B, a one (1) byte option header including an NPD field 913 may be arranged at a front of a payload.

Figure 9C:
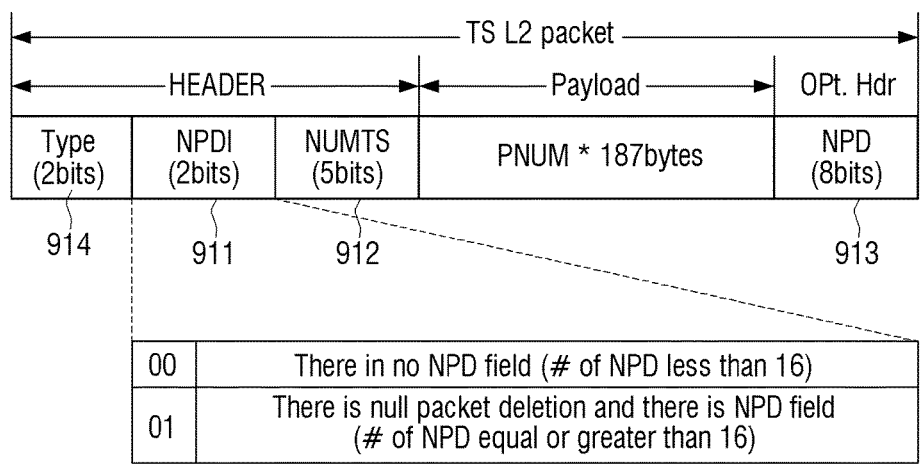

Referring to FIG. 9C, an NPDI field 911 may have one (1) bit, and an NUMTS field 912 may have five (5) bits, differently from FIG. 9A.

When the NPDI field 911 is set to a value "1", the NPD field 913 is allocated at an end of a payload, and indicates a quotient calculated from dividing the number of deleted null packets with 16. Here, the number of deleted null packets (NPDI=0 or 1) may be calculated according to the above-mentioned mathematical formula 1.

Figure 9D:
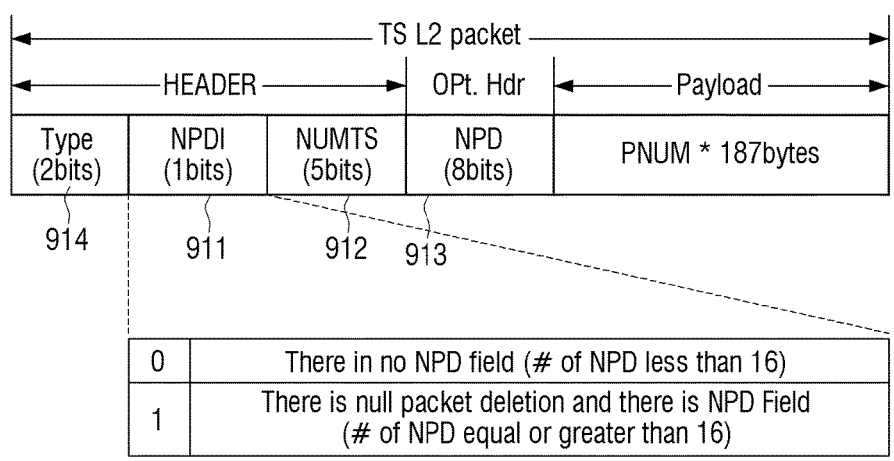

FIG. 9D illustrates a modified embodiment of FIG. 9C. Referring to FIG. 9D, a one (1) byte option header including an NPD field 913 may be arranged at a front of a payload.

Figure 9E:
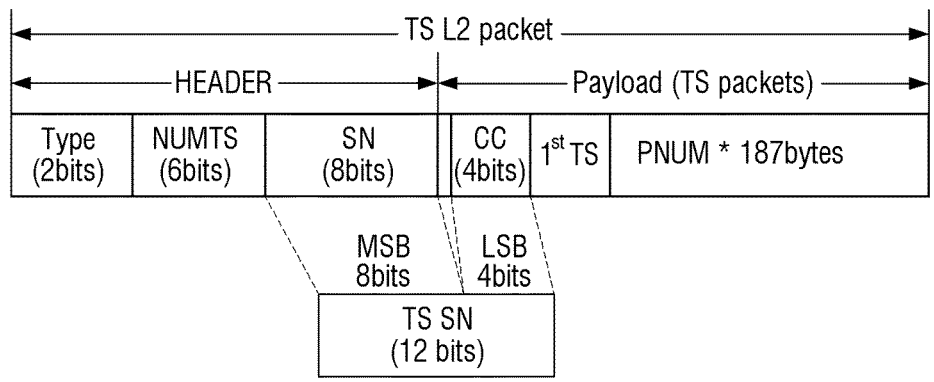
Figure 9F:
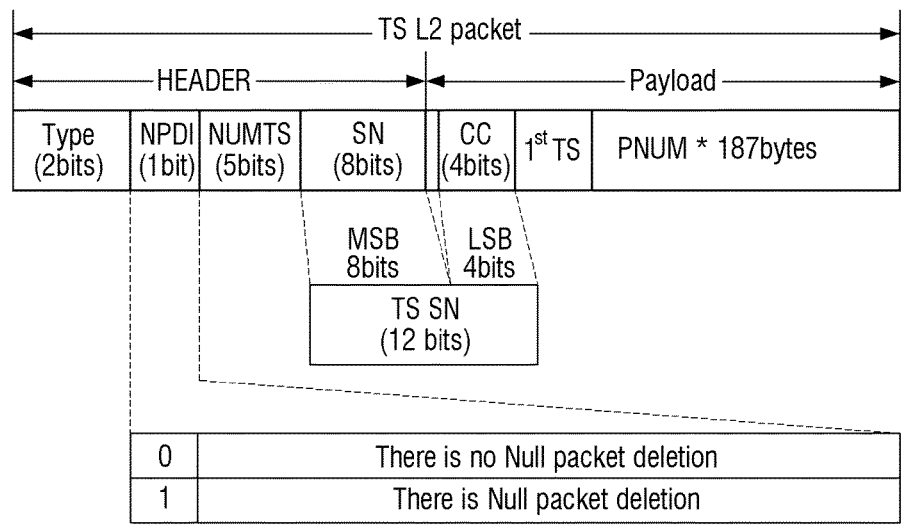
Figure 9G:
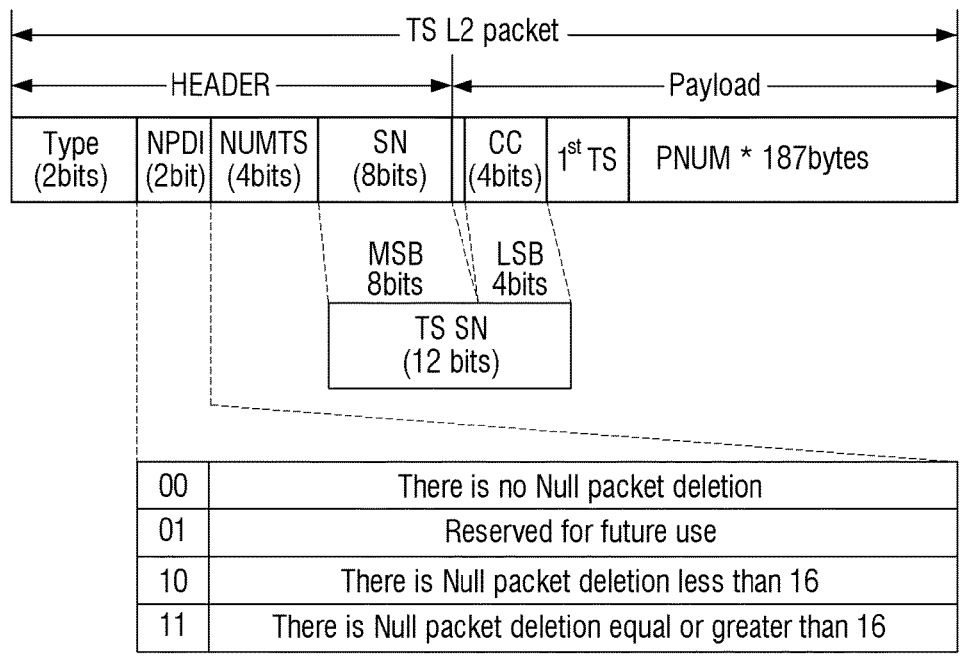

FIGS. 9E to 9G illustrate exemplary embodiments in which an SN byte for a TS packet is additionally allocated. Each embodiment is similar to the embodiments of FIGS. 8A to 8C, which will not be further explained.

Figure 9H:
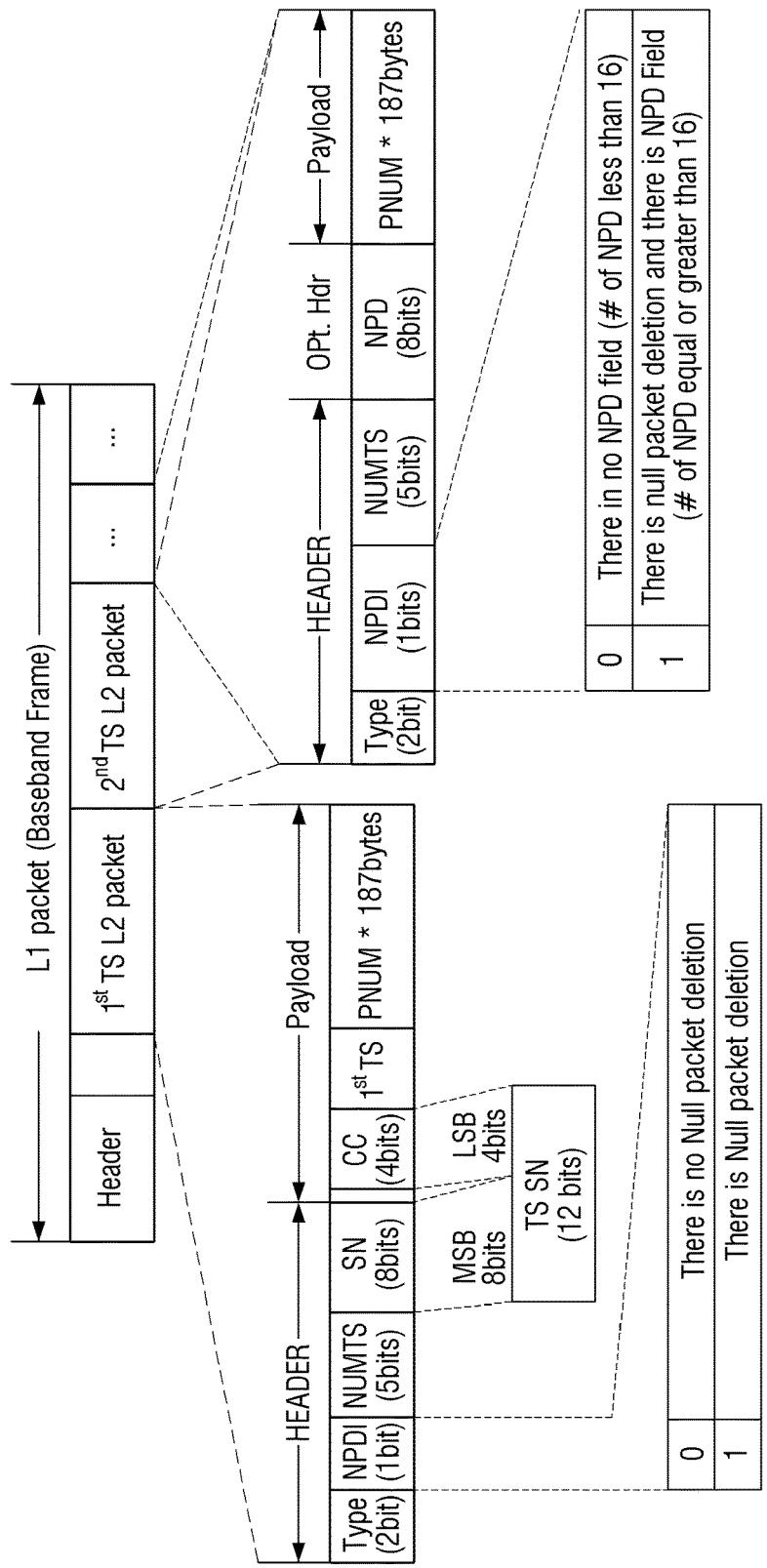

Referring to FIG. 9H, the embodiment of FIG. 9E or FIG. 9F or FIG. 9G may be applied to a first TS L2 packet of an L1 packet. Further, the embodiment of FIG. 9B or FIG. 9D may be applied to another TS L2 packet of the L1 packet.

Figure 10:
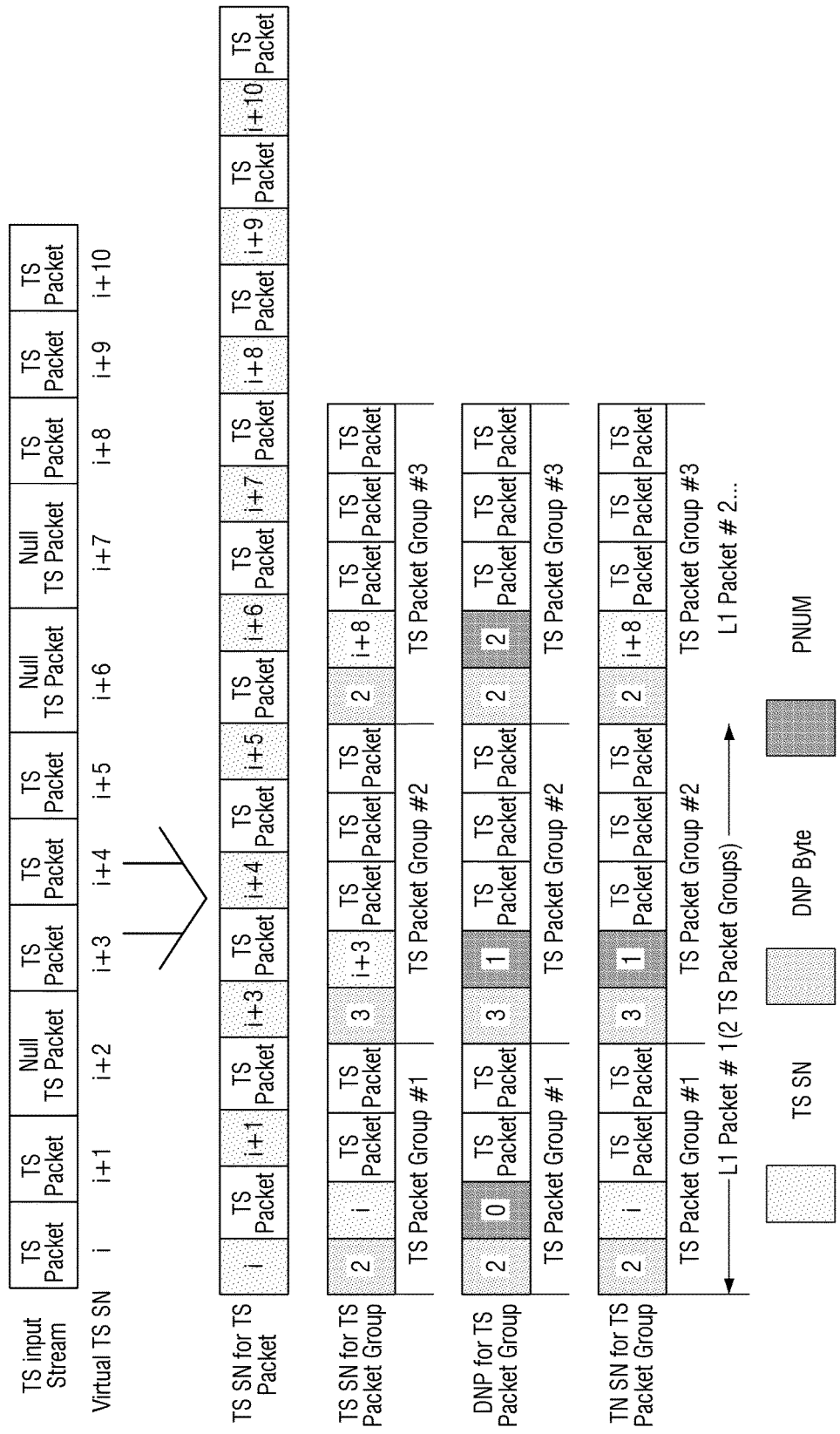
FIG. 10 is a view provided to briefly explain a case of applying a TS mode adaptation according to various exemplary embodiments.

FIG. 10 is a view provided to briefly explain a case in which TS mode adaptation is applied according to various exemplary embodiments.

FIG. 10 illustrates that TS mode adaptation is applied according to the above various embodiments after allocating a virtual TS SN to each TS packet of a TS incoming stream.

In this case, TS sync byte deletion may be always applied. However, if TS sync byte deletion is not applied, an L1 signaling area may indicate whether to apply sync-removing.

Figure 11A:
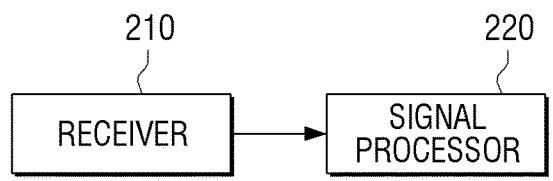
FIG. 11A is a block diagram of a receiving apparatus according to an exemplary embodiment.

FIG. 11A is a block diagram of a receiving apparatus according to an exemplary embodiment.

Referring to FIG. 11A, the receiving apparatus 200 includes a receiver 210 and a signal processor 220.

The receiving apparatus 200 may be implemented to receive data from a transmitting apparatus which maps data in an incoming stream including only a first type stream to one or more signal processing paths and transmits the same. Thus, the receiving apparatus 200 may receive a transmission frame in which only the first type stream is mapped with one or more signal processing paths.

The receiver 210 receives a frame which includes data mapped to one or more signal processing paths. The receiver 210 may receive a stream which includes signaling information and data mapped to one or more signal processing paths. The signaling information may include information about an input type of an incoming stream received at the transmitting apparatus and information about a data type mapped to one or more signal processing paths. The information about an input type of an incoming stream may indicate whether all signal processing paths within the frame is a same input type. The other information included in the signaling information is described above, which will not be further explained.

The signal processor 220 extracts signaling information from the received frame. The signal processor 220 may obtain various pieces of information about a PLP included in an L1 pre-signaling area and an L1 post-signaling area by extracting and decoding L1 signaling information. Further, the signal processor 230 may signal-process the frame based on the extracted and decoded signaling information. For example, signal-processing may perform demodulating, frame de-building, BICM decoding, and input de-processing.

Specifically, the signal processor 220 generates a baseband frame by signal-processing the received frame from the receiver 210, and extracts header information from a plurality of baseband packets included in the baseband frame.

Further, the signal processor 220 may restore the stream, i.e., the incoming stream described above as being input to the transmitting apparatus by signal-processing payload data included in the baseband packets based on the extracted header information. The header information may include information about whether the number of null packets which are deleted when generating a baseband packet is more than a predetermined number, the number of the first type stream packets within the baseband packet, and the number of the deleted null packets.

Here, the first type stream may be a TS or TS stream.

Further, the header may include a base header and an option header as described above.

In this case, the base header may include information about whether the number of null packets which are deleted when generating baseband a packet is more than a predetermined number, the number of the first type stream packets within the baseband packet, and the number of null packets less than the predetermined number.

Further, the option header may include information about an ISCR related to the baseband packet and information about the number of null packets exceeding the predetermined number when the number of deleted null packets is more than the predetermined number.

Figure 11B:
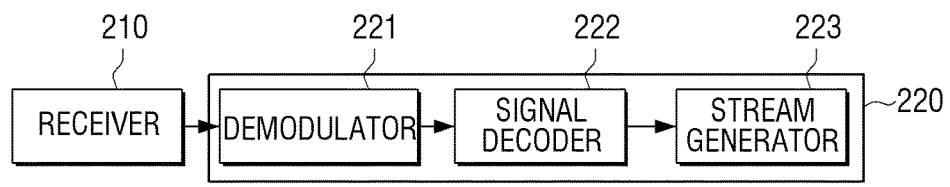
FIG. 11B is a block diagram provided to explain in detail a signal processor according to an exemplary embodiment.

FIG. 11B is a block diagram provided to explain in detail the signal processor according to an exemplary embodiment.

Referring to FIG. 11B, the signal processor 220 includes a demodulator 221, a decoder 222 and a stream generator 223.

The demodulator 221 performs demodulation according to OFDM parameters from the received RF signals, performs sync-detection, and recognizes whether the currently received frame from the signaling information stored in the sync area includes necessary service data when the sync is detected. For example, the demodulator 221 may recognize whether a mobile frame is received or a fixed frame is received.

In this case, if OFDM parameters are not previously determined regarding a signaling area and a data area, the demodulator 221 may perform demodulation by obtaining OFDM parameters regarding the signaling area and the data area stored in a sync area, and obtaining information about OFDM parameters regarding the signaling area and the data area which are disposed right after the sync area.

The decoder 222 performs decoding of necessary data. In this case, the decoder 222 may perform decoding by obtaining parameters of an FEC method and the modulating method regarding the data stored in each data area based on the signaling information. Further, the decoder 222 may calculate positions of necessary data based on the data information included in a configurable field and a dynamic field. Thus, it may calculate which positions of the frame a requested PLP is transmitted.

The stream generator 223 may generate data to be served by processing a baseband frame input from the decoder 222.

For example, the stream generator 223 may generate a baseband packet from the baseband frame in which errors are corrected based on an ISSY mode, buffer size (BUFS), time to output (TTO) values and ISCR values.

Specifically, the stream generator 223 may include de-jitter buffers. The de-jitter buffers may regenerate correct timing to restore an output stream based on the ISSY mode, BUFS, TTO values and ISCR values. Thereby, a delay for sync between a plurality of PLPs can be compensated.

FIG. 12 is a flowchart provided to explain a signal processing method of a transmitting apparatus, according to an exemplary embodiment.

According to the signal processing method of the transmitting apparatus illustrated in FIG. 12, a baseband packet including a header and payload data corresponding to an incoming first type stream is generated at S1210. Here, the header may include information about whether the number of null packets deleted when generating a baseband packet is more than a predetermined number, the number of a first type stream packets within the baseband packet, and the number of the deleted null packets.

At S1220, a frame including the baseband packet is generated. Here, the frame may be a baseband frame.

At S1230, the generated frame is signal-processed.

At 51240, the signal-processed frame is transmitted. Here, the signal-processed frame may be a transmission frame.

Here, the first type stream may be a TS stream.

Further, the header may further include information about the ISCR related to the baseband packet.

Further, the header may be constituted with a base header and an option header. In this case, the base header may include information about whether the number of null packets deleted when generating a baseband packet is more than a predetermined number, the number the first type stream packets within the baseband packet, and the number of null packets less than the predetermined number. Further, the option header may include information about the ISCR related to the baseband packet and information about the number of null packets exceeding the predetermined number if the number of deleted null packets is more than the predetermined number.

Figure 13:
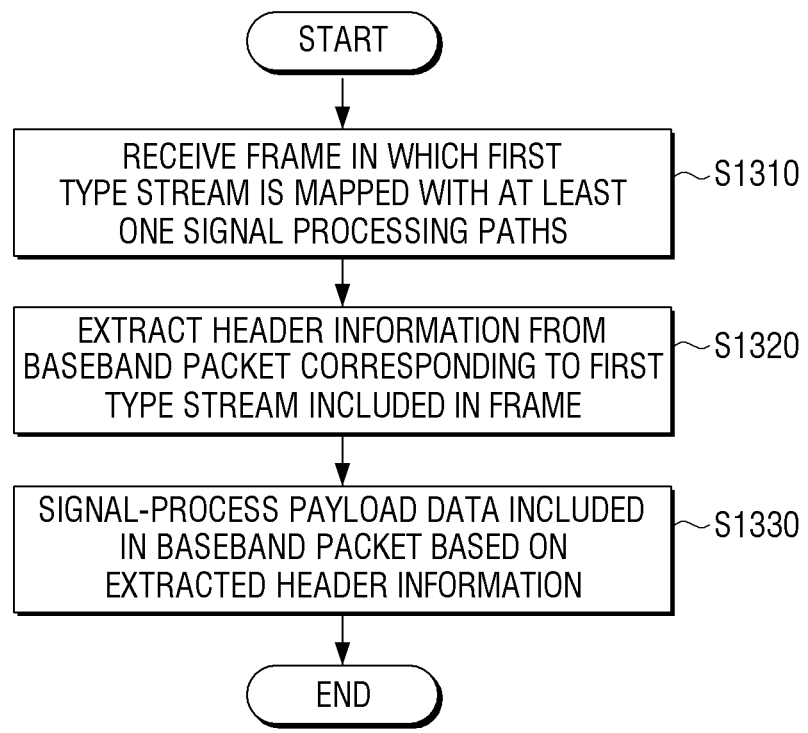
FIG. 13 is a flowchart provided to explain a signal processing method of a receiving apparatus according to an exemplary embodiment.

FIG. 13 is a flowchart provided to explain a signal processing method of a receiving apparatus, according to an exemplary embodiment.

According to the signal processing method of the receiving apparatus receiving data from a transmitting apparatus which maps data included in an incoming first type stream with one or more signal processing paths and transmits the same, a frame in which the first type stream is mapped with one or more signal processing paths is received at S1310.

At S1320, header information is extracted from a baseband packet corresponding to the first type stream included in the received frame.

At S1330, payload data included in the baseband packet is signal-processed based on the extracted header information. Here, the header information may include information about whether the number of null packets deleted when generating a baseband packet is more than a predetermined number, the number of the first type stream packets within the baseband packet, and the number of the deleted null packets.

Here, the first type stream may be a TS or TS stream.

Further, the header information may include information about the ISCR related with the baseband packet.

The header includes a base header and an option header, and the base header may include information about whether the number of null packets deleted when generating a baseband packet is more than a predetermined number, the number of the first type stream packets within the baseband packet, and the number of null packets less than the predetermined number. Further, the option header may include information about the ISCR related with the baseband packet and information about the number of null packets exceeding the predetermined number when the number of deleted null packets is more than the predetermined number.

Meanwhile, according to some embodiments, null packets disposed prior to a TS packet group may be deleted, but the inventive concept is not limited thereto. Accordingly, in another exemplary embodiment, the null packets disposed after a TS packet group may be deleted.

Figure 14:
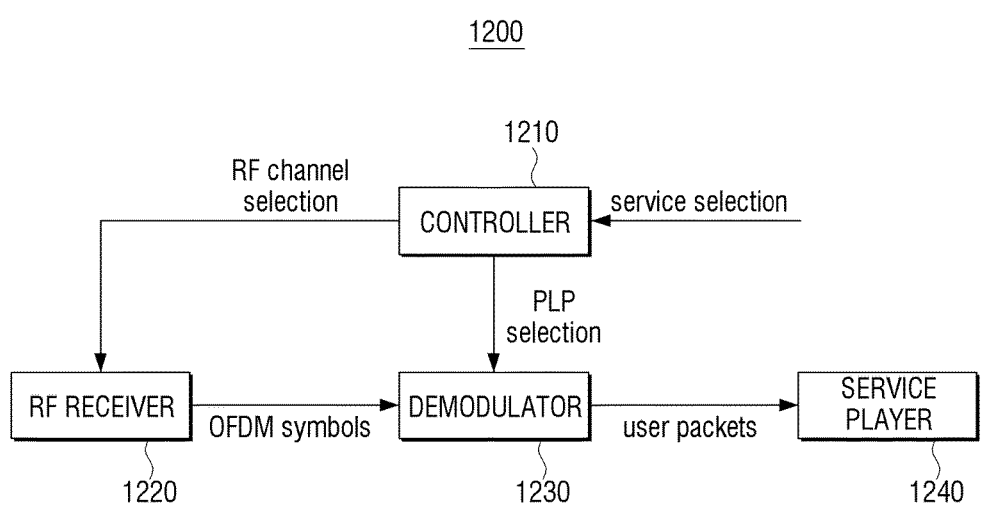
FIG. 14 is a block diagram of a receiver according to an exemplary embodiment.

FIG. 14 is a block diagram of a receiving apparatus according to an exemplary embodiment.

Referring to FIG. 14, the receiving apparatus 1200 may include a controller 1210, an RF receiver 1220, a demodulator 1230, and a service player 1240.

The controller 1210 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service are transmitted through one PLP with one RF channel for convenient explanation. Thus, services are provided with a unique data obtaining path to play services, and the data obtaining path is specified by an RF channel and a PLP.

The RF receiver 1220 extracts RF signals from a selected RF channel by the controller 1210, and delivers OFDM symbols, extracted by performing signal-processing of the RF signals, to the demodulator 1230. The signal processing may include synchronization, channel estimation and equalization. Information required for the signal processing is predetermined between a transmitting and the receiving apparatuses or transmitted to the receiving apparatus in a predetermined OFDM symbols among the OFDM symbols.

The demodulator 1230 extracts a user packet by performing signal processing of the OFDM symbols, and delivers to the service player 1240. The service player 1240 plays and outputs the service selected by a user with the user packet. A format of the user packet may be different according to implementing services. For example, a TS packet or an IPv4 packet may be the user packet.

Figure 15:
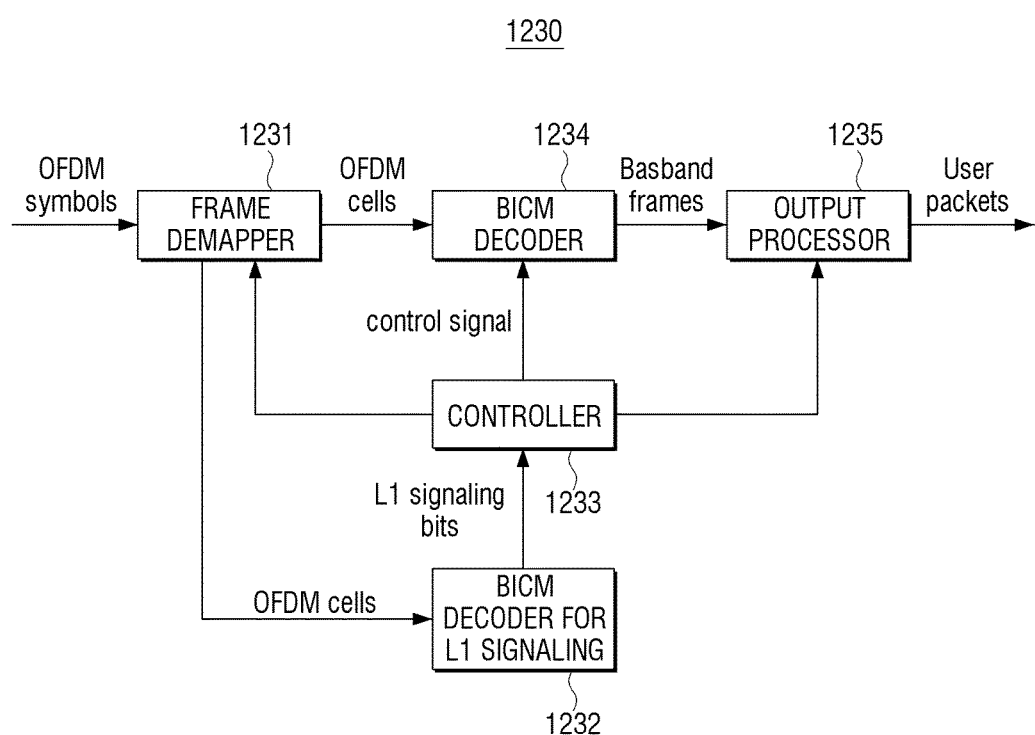
FIG. 15 is a detailed block diagram of a demodulator 1230 of FIG. 14 according to an exemplary embodiment.

FIG. 15 is a block diagram describing the demodulator 1230 of FIG. 14 according to an exemplary embodiment.

Referring to FIG. 15, the demodulator 1230 may include a frame demapper 1231, a BICM decoder 1232 for L1 signaling, a controller 1233, a BICM decoder 1234, and an output processor 1235.

The frame demapper 1231 selects OFDM cells constituting FEC blocks belonging to a selected PLP from a frame constituted with OFDM symbols based on controlling information delivered from the controller 1233, and delivers to the decoder 1234. Further, the frame demapper 1231 selects OFDM cells corresponding to more than one FEC block included in L1 signaling, and delivers to BICM decoder 1232 for L1 signaling.

The BICM decoder 1232 for L1 signaling signal-processes OFDM cells corresponding to FEC blocks belonging to L1 signaling, extracts L1 signaling bits, and delivers to the controller 1233. In this case, the signal processing may include extracting log-likelihood ratio (LLR) values for decoding LDPC codes in OFDM cells, and decoding LDPC codes by using the extracted LLR values.

The controller 1233 extracts an L1 signaling table from L1 signaling bits, and controls operations of the frame demapper 1231, the BICM decoder 1234, and the output processor 1235 by using values of the L1 signaling table. FIG. 11 illustrates that the BICM decoder 1232 for L1 signaling does not use controlling information of the controller 1233 for convenient explanation. However, if L1 signaling includes a layer structure similar to the L1 pre-signaling and the L1 post-signaling described above, the BICM decoder 1232 for L1 signaling may be constituted with more than one BICM decoding block, and operations of the BICM decoding blocks and the frame demapper 1231 may be controlled based on upper-layer L1 signaling information, as clearly understood in the above description.

The BICM decoder 1234 signal-processes OFDM cells constituting FEC blocks belonging to the selected PLP, extracts baseband frames, and delivers the baseband frames to the output processor 1235. The signal processing may include extracting LLR values for coding and decoding LDPC in OFDM cells, and decoding LDPC codes by using the extracted LLR values. These two operations may be performed based on the controlling information delivered from the controller 1233.

The output processor 1235 signal-processes the baseband frames, extracts a user packet, and delivers the extracted user packet to the service player. In this case, the signal processing may be performed on the controlling information delivered from the controller 1233.

Meanwhile, according to an exemplary embodiment, the output processor 1235 may include a baseband packet processor (not illustrated) which extracts a baseband packet from the baseband frame. Further, a format or configuration of the extracted baseband packet is the same as the format according to the previous embodiments, e.g., the format illustrated in FIG. 6B (in this case, a PLP transmits a baseband packet having a format illustrated in FIG. 6B according to L1 signaling). Whether there is a DNPL field (8 bits) is determined from first bit NPDI field information about a header of an incoming baseband packet. If an NPDI field is set to a value "0", the baseband packet processor may restore null TS packets as many as the number set in the DNPS field (3 bits). If the NPDI field is set to a value "1", the baseband packet processor may restore null TS packets as many as the number set in the DNPS field and the DNPL field (11 bits), and deliver to the service player 1240. Further, the baseband packet processor may confirm whether to apply an ISSY from L1 signaling, whether there is an optional header from values of the NPDI, field and a size of the optional header when there is an optional header. The baseband packet processor may insert a sync byte (0x47) into each of a number of TS packets (187 bytes) as many as the number set in an NUMTS field, restore TS packets (187 bytes) and deliver to the service player 1240.

Figure 16:
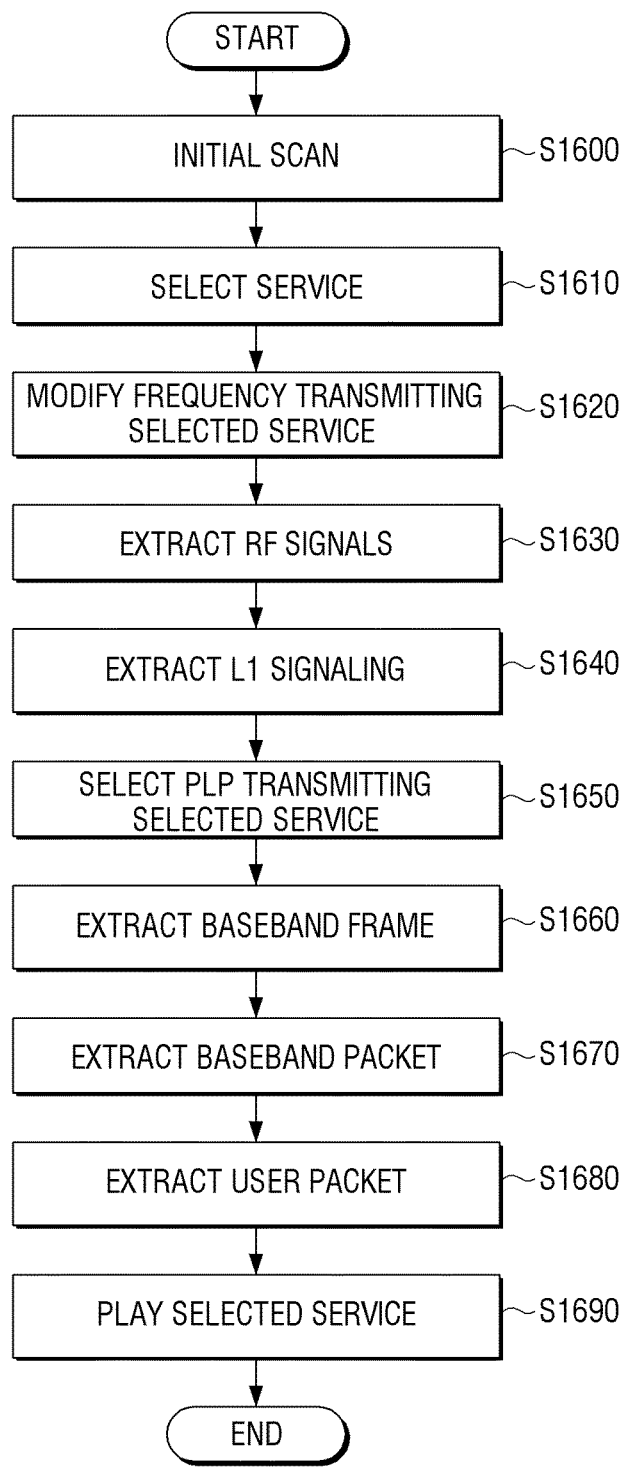
FIG. 16 is a flowchart provided to briefly explain operations of a receiver from a time point when a user selects a service to a time point when the selected service is played, according to an exemplary embodiment.

FIG. 16 is a flowchart provided to briefly explain an operation of a receiving apparatus from a time point when a user selects a service to a time point when the selected service is played.

It is assumed that service information about all the services that can be selected at an initial scan process of S1600 is obtained prior to a service select process at S1610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and an upper layer signaling.

When a user selects a service at S1610, the receiving apparatus modifies a frequency transmitting the selected service at S1620, and performs extracting RF signals at S1630. While performing S1620 modifying the frequency transmitting the selected service, the service information may be used.

When RF signals are extracted, the receiver performs S1640 extracting L1 signaling from the extracted RF signals. The receiving apparatus selects the PLP transmitting the selected service by using the extracted L1 signaling at S1650, and extracts a baseband frame from the selected PLP at S1660. At S1650 selecting the PLP transmitting the selected service, the service information may be used.

Further, S1660 extracting the baseband frame may include selecting OFDM cells belonging to the PLP by demapping a transmission frame, extracting LLR values for coding/decoding LDPC, and decoding LDPC codes by using the extracted LLR values.

The receiving apparatus performs S1670 extracting a baseband packet from the extracted baseband frame by using header information about the extracted baseband frame, and performs S1680 extracting a user packet from the extracted baseband packet by using header information about the extracted baseband packet. The extracted user packet is used in S1690 playing the selected service. At S1670 extracting the baseband packet and at S1680 extracting the user packet, L1 signaling information obtained at S1640 extracting L1 signaling may be used. In this case, a process of extracting the user packet from the baseband packet (restoring null TS packet and inserting TS sync byte) is the same as described above.

According to an exemplary embodiment, the L1 signaling includes information about a type of a user packet transmitted through a corresponding PLP and an operation used to encapsulate the user packet in the baseband frame. This information may be used at S1680 extracting the user packet. The user packet is extracted through processes inverse to the operations used in the encapsulating process.

According to an exemplary embodiment, the L1 signaling may also include information about an ISSY mode, information about a buffer size of a receiving apparatus which is requested according to ISSY mode information, and information about an output time of a first user packet regarding a corresponding PLP included in a frame. This information may be used in controlling a buffer at S1680 extracting the user packet. This information may be used to control a size of the buffer storing the extracted user packet and a time when the user packet is output to the service player.

According to the above various exemplary embodiments, various types of data can be mapped to a physical layer that can be transmitted, and a data processing efficiency can be enhanced.

Meanwhile, a non-transitory computer readable recording medium storing programs to perform the methods described above may be provided according to an exemplary embodiment.

The non-transitory computer readable recording medium indicate a medium which store data semi-permanently and can be read by devices, not a medium storing data temporarily such as register, cache, or memory. Specifically, the above various applications or programs may be stored and provided in a non-transitory computer readable recording medium such as compact disc (CD), digital versatile disk (DVD), hard disk, Blu-ray disk, universal serial memory (USB), memory card, or read-only memory (ROM).

Components, elements or units represented by a block as illustrated in FIGS. 1, 2, 4, 5A, 11A, 11B, 14 and 15 may be embodied as the various numbers of hardware, software and/or firmware structures that execute respective functions described above, according to exemplary embodiments. For example, these components, elements or units may use a direct circuit structure, such as a memory, processing, logic, a look-up table, etc. that may execute the respective functions through controls of one or more microprocessors or other control apparatuses. These components, elements or units may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like. Further, although the above-mentioned drawings do not illustrate a bus, communication between the components, elements or units may be performed through a bus.

The foregoing exemplary embodiments and advantages are merely exemplary and are not to be construed as limiting the inventive concept. The present teaching can be readily applied to other types of apparatuses. Also, the description of the exemplary embodiments of the present inventive concept is intended to be illustrative, and not to limit the scope of the claims.

What is claimed is:

1. A method for generating a packet of a transmitting apparatus, the method comprising:
    increasing a value of a Deleted Null Packet (DNP) counter for each deleted null packet preceding a non-null transport stream (TS) packet among at least one non-null TS packet;
    generating a packet comprising a header and a payload;
    generating a frame based on the packet; and
    transmitting a signal which is generated based on the frame,
    wherein the header comprises a DNP field,
    wherein the value of the DNP counter is used to set the DNP field,
    wherein the at least one non-null TS packet is included in an input stream, and
    wherein the non-null TS packet is a first encapsulated packet in the payload.

2. The method of claim 1, wherein the header comprises a base header and an additional header,
    wherein the base header comprises a field indicating that a packet type of an input stream is a TS packet and a field indicating a number of at least one non-null TS packet included in the packet, and
    wherein the additional header comprises the DNP field.

3. The method of claim 1, wherein the header further comprises information about an input stream clock reference (ISCR) related with the packet.

* * * * *